United States Patent
McCusker et al.

(10) Patent No.: US 9,384,586 B1
(45) Date of Patent: Jul. 5, 2016

(54) ENHANCED FLIGHT VISION SYSTEM AND METHOD WITH RADAR SENSING AND PILOT MONITORING DISPLAY

(71) Applicants: Patrick D. McCusker, Walker, IA (US); Richard D. Jinkins, Rewey, WI (US); Richard M. Rademaker, Cedar Rapids, IA (US)

(72) Inventors: Patrick D. McCusker, Walker, IA (US); Richard D. Jinkins, Rewey, WI (US); Richard M. Rademaker, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/301,199

(22) Filed: Jun. 10, 2014

(51) Int. Cl.
  *G06T 15/20* (2011.01)
  *G01S 13/95* (2006.01)

(52) U.S. Cl.
  CPC .............. *G06T 15/20* (2013.01); *G01S 13/953* (2013.01)

(58) Field of Classification Search
  None
  See application file for complete search history.

(56) References Cited

U.S. PATENT DOCUMENTS

| | | | |
|---|---|---|---|
| 2,416,155 A | 2/1947 | Chubb | |
| 2,849,184 A | 8/1958 | Arden et al. | |
| 2,929,059 A | 3/1960 | Parker | |
| 2,930,035 A | 3/1960 | Altekruse | |
| 2,948,892 A | 8/1960 | White | |
| 2,965,894 A | 12/1960 | Sweeney | |
| 2,994,966 A | 8/1961 | Senitsky et al. | |
| 3,031,660 A | 4/1962 | Young | |
| 3,049,702 A | 8/1962 | Schreitmueller | |
| 3,064,252 A | 11/1962 | Varela | |
| 3,070,795 A | 12/1962 | Chambers | |
| 3,071,766 A | 1/1963 | Fenn | |
| 3,072,903 A | 1/1963 | Meyer | |
| 3,089,801 A | 5/1963 | Tierney et al. | |
| 3,107,351 A | 10/1963 | Milam | |
| 3,113,310 A | 12/1963 | Standing | |
| 3,129,425 A | 4/1964 | Sanner | |
| 3,153,234 A | 10/1964 | Begeman et al. | |
| 3,175,215 A | 3/1965 | Blasberg et al. | |
| 3,212,088 A | 10/1965 | Alexander et al. | |

(Continued)

FOREIGN PATENT DOCUMENTS

| | | |
|---|---|---|
| DE | 196 49 838 | 4/1998 |
| EP | 0 556 351 B1 | 6/1995 |

(Continued)

OTHER PUBLICATIONS

Airports Authority of India, Chapter 7: Visual aids for navigation-lights, available prior to Jan. 1, 2005, retrieved from the internet at: http://www.aai.aero/aai_employees/chapter_7.pdf on Sep. 26, 2014, 33 pages.

(Continued)

*Primary Examiner* — Said Broome
(74) *Attorney, Agent, or Firm* — Donna P. Suchy; Daniel M. Barbieri

(57) ABSTRACT

An image processing system for enhanced flight vision includes a processor and memory coupled to the processor. The memory contains program instructions that, when executed, cause the processor to receive radar returns data for a runway structure, generate a three-dimensional model representative of the runway structure based on the radar returns data, generate a two-dimensional image of the runway structure from the three-dimensional model, and generate an aircraft situation display image representative of the position of the runway structure with respect to an aircraft based on the two-dimensional image.

20 Claims, 4 Drawing Sheets

(56) References Cited

U.S. PATENT DOCUMENTS

| | | |
|---|---|---|
| 3,221,328 A | 11/1965 | Walter |
| 3,241,141 A | 3/1966 | Wall |
| 3,274,593 A | 9/1966 | Varela et al. |
| 3,325,807 A | 6/1967 | Burns et al. |
| 3,334,344 A | 8/1967 | Colby, Jr. |
| 3,339,199 A | 8/1967 | Pichafroy |
| 3,373,423 A | 3/1968 | Levy |
| 3,397,397 A | 8/1968 | Barney |
| 3,448,450 A | 6/1969 | Alfandari et al. |
| 3,618,090 A | 11/1971 | Garrison |
| 3,680,094 A | 7/1972 | Bayle et al. |
| 3,716,855 A | 2/1973 | Asam |
| 3,739,380 A | 6/1973 | Burdic et al. |
| 3,781,878 A | 12/1973 | Kirkpatrick |
| 3,810,175 A | 5/1974 | Bell |
| 3,815,132 A | 6/1974 | Case et al. |
| 3,851,758 A | 12/1974 | Makhijani et al. |
| 3,866,222 A | 2/1975 | Young |
| 3,885,237 A | 5/1975 | Kirkpatrick |
| 3,956,749 A | 5/1976 | Magorian |
| 4,024,537 A | 5/1977 | Hart |
| 4,058,701 A | 11/1977 | Gruber et al. |
| 4,058,710 A | 11/1977 | Altmann |
| 4,063,218 A | 12/1977 | Basov et al. |
| 4,235,951 A | 11/1980 | Swarovski |
| 4,277,845 A | 7/1981 | Smith et al. |
| 4,405,986 A | 9/1983 | Gray |
| 4,435,707 A | 3/1984 | Clark |
| 4,481,519 A | 11/1984 | Margerum |
| 4,532,515 A | 7/1985 | Cantrell et al. |
| 4,594,676 A | 6/1986 | Breiholz et al. |
| 4,595,925 A | 6/1986 | Hansen |
| 4,598,292 A | 7/1986 | Devino |
| 4,628,318 A | 12/1986 | Alitz |
| 4,646,244 A | 2/1987 | Bateman et al. |
| 4,649,388 A | 3/1987 | Atlas |
| 4,654,665 A | 3/1987 | Kiuchi et al. |
| 4,685,149 A | 8/1987 | Smith et al. |
| 4,760,396 A | 7/1988 | Barney et al. |
| 4,828,382 A | 5/1989 | Vermilion |
| 4,843,398 A | 6/1989 | Houston et al. |
| 4,912,477 A | 3/1990 | Lory et al. |
| 4,914,436 A | 4/1990 | Bateman et al. |
| 4,924,401 A | 5/1990 | Bice et al. |
| 4,939,513 A | 7/1990 | Paterson et al. |
| 4,951,059 A | 8/1990 | Taylor, Jr. |
| 4,953,972 A | 9/1990 | Zuk |
| 4,965,573 A | 10/1990 | Gallagher et al. |
| 4,987,419 A | 1/1991 | Salkeld |
| 5,045,855 A | 9/1991 | Moreira |
| 5,047,779 A | 9/1991 | Hager |
| 5,047,781 A | 9/1991 | Bleakney |
| 5,049,886 A | 9/1991 | Seitz et al. |
| 5,166,688 A | 11/1992 | Moreira |
| 5,173,703 A | 12/1992 | Mangiapane et al. |
| 5,175,554 A | 12/1992 | Mangiapane et al. |
| 5,198,819 A | 3/1993 | Susnjara |
| 5,202,690 A | 4/1993 | Frederick |
| 5,247,303 A | 9/1993 | Cornelius et al. |
| 5,273,553 A | 12/1993 | Hoshi et al. |
| 5,311,183 A | 5/1994 | Mathews et al. |
| 5,329,391 A | 7/1994 | Miyamoto et al. |
| 5,332,998 A | 7/1994 | Avignon et al. |
| 5,345,241 A | 9/1994 | Huddle |
| 5,365,356 A | 11/1994 | McFadden |
| 5,442,364 A | 8/1995 | Lee et al. |
| 5,539,409 A | 7/1996 | Mathews et al. |
| 5,559,515 A | 9/1996 | Alimena et al. |
| 5,559,518 A | 9/1996 | DiDomizio |
| 5,566,840 A | 10/1996 | Waldner et al. |
| 5,592,178 A | 1/1997 | Chang et al. |
| 5,678,303 A | 10/1997 | Wichmann |
| 5,736,957 A | 4/1998 | Raney |
| 5,820,080 A | 10/1998 | Eschenbach |
| 5,828,332 A | 10/1998 | Frederick |
| 5,831,570 A | 11/1998 | Ammar et al. |
| 5,839,080 A | 11/1998 | Muller et al. |
| 5,867,119 A | 2/1999 | Corrubia et al. |
| 5,894,286 A | 4/1999 | Morand et al. |
| 5,918,517 A | 7/1999 | Malapert et al. |
| 5,920,276 A | 7/1999 | Frederick |
| 5,923,279 A | 7/1999 | Bamler et al. |
| 5,936,575 A | 8/1999 | Azzarelli et al. |
| 5,942,062 A | 8/1999 | Hassall et al. |
| 5,945,926 A | 8/1999 | Ammar et al. |
| 5,950,512 A | 9/1999 | Fields |
| 5,959,762 A | 9/1999 | Bandettini et al. |
| 5,978,715 A | 11/1999 | Briffe et al. |
| 6,002,347 A | 12/1999 | Daly et al. |
| 6,023,240 A | 2/2000 | Sutton |
| 6,061,016 A | 5/2000 | Lupinski et al. |
| 6,061,022 A | 5/2000 | Menegozzi et al. |
| 6,064,942 A | 5/2000 | Johnson et al. |
| 6,075,484 A | 6/2000 | Daniel et al. |
| 6,092,009 A | 7/2000 | Glover |
| 6,112,141 A | 8/2000 | Briffe et al. |
| 6,112,570 A | 9/2000 | Hruschak |
| 6,122,570 A | 9/2000 | Muller et al. |
| 6,127,944 A | 10/2000 | Daly et al. |
| 6,128,066 A | 10/2000 | Yokozeki |
| 6,128,553 A | 10/2000 | Gordon et al. |
| 6,138,060 A | 10/2000 | Conner et al. |
| 6,150,901 A | 11/2000 | Auken |
| 6,154,151 A | 11/2000 | McElreath et al. |
| 6,154,169 A | 11/2000 | Kuntman |
| 6,157,339 A | 12/2000 | Sato et al. |
| 6,157,891 A | 12/2000 | Lin |
| 6,163,021 A | 12/2000 | Mickelson |
| 6,166,661 A | 12/2000 | Anderson et al. |
| 6,169,770 B1 | 1/2001 | Henely |
| 6,178,391 B1 | 1/2001 | Anderson et al. |
| 6,184,816 B1 | 2/2001 | Zheng et al. |
| 6,188,330 B1 | 2/2001 | Glover |
| 6,194,980 B1 | 2/2001 | Thon |
| 6,199,008 B1 | 3/2001 | Aratow et al. |
| 6,201,494 B1 | 3/2001 | Kronfeld |
| 6,204,806 B1 | 3/2001 | Hoech |
| 6,205,400 B1 | 3/2001 | Lin |
| 6,208,284 B1 | 3/2001 | Woodell et al. |
| 6,219,592 B1 | 4/2001 | Muller et al. |
| 6,233,522 B1 | 5/2001 | Morici |
| 6,236,351 B1 | 5/2001 | Conner et al. |
| 6,259,400 B1 | 7/2001 | Higgins et al. |
| 6,266,114 B1 | 7/2001 | Skarohlid |
| 6,278,799 B1 | 8/2001 | Hoffman |
| 6,281,832 B1 | 8/2001 | McElreath |
| 6,285,298 B1 | 9/2001 | Gordon |
| 6,285,337 B1 | 9/2001 | West et al. |
| 6,285,926 B1 | 9/2001 | Weiler et al. |
| 6,289,277 B1 | 9/2001 | Feyereisen et al. |
| 6,311,108 B1 | 10/2001 | Ammar et al. |
| 6,317,468 B1 | 11/2001 | Meyer |
| 6,317,690 B1 | 11/2001 | Gia |
| 6,317,872 B1 | 11/2001 | Gee et al. |
| 6,340,946 B1 | 1/2002 | Wolfson et al. |
| 6,345,127 B1 | 2/2002 | Mitchell |
| 6,359,585 B1 | 3/2002 | Bechman et al. |
| 6,366,013 B1 | 4/2002 | Leenders et al. |
| 6,373,418 B1 | 4/2002 | Abbey |
| 6,374,286 B1 | 4/2002 | Gee et al. |
| 6,377,202 B1 | 4/2002 | Kropfli et al. |
| 6,377,892 B1 | 4/2002 | Johnson et al. |
| 6,388,607 B1 | 5/2002 | Woodell |
| 6,388,608 B1 | 5/2002 | Woodell et al. |
| 6,388,724 B1 | 5/2002 | Campbell et al. |
| 6,389,354 B1 | 5/2002 | Hicks et al. |
| 6,401,038 B2 | 6/2002 | Gia |
| 6,411,890 B1 | 6/2002 | Zimmerman |
| 6,421,000 B1 | 7/2002 | McDowell |
| 6,421,603 B1 | 7/2002 | Pratt et al. |
| 6,424,288 B1 | 7/2002 | Woodell |
| 6,426,717 B1 | 7/2002 | Maloratsky |
| 6,426,720 B1 | 7/2002 | Ross et al. |
| 6,427,122 B1 | 7/2002 | Lin |

(56) References Cited

U.S. PATENT DOCUMENTS

| | | |
|---|---|---|
| 6,441,773 B1 | 8/2002 | Kelly et al. |
| 6,445,310 B1 | 9/2002 | Bateman et al. |
| 6,448,922 B1 | 9/2002 | Kelly |
| 6,452,511 B1 | 9/2002 | Kelly et al. |
| 6,456,236 B1 | 9/2002 | Hauck et al. |
| 6,456,238 B1 | 9/2002 | Posey |
| 6,462,703 B2 | 10/2002 | Hedrick |
| 6,473,026 B1 | 10/2002 | Ali-Mehenni et al. |
| 6,473,037 B2 | 10/2002 | Vail et al. |
| 6,473,240 B1 | 10/2002 | Dehmlow |
| 6,481,482 B1 | 11/2002 | Shimotomai |
| 6,492,934 B1 | 12/2002 | Hwang et al. |
| 6,501,424 B1 | 12/2002 | Haendel et al. |
| 6,512,476 B1 | 1/2003 | Woodell |
| 6,512,527 B1 | 1/2003 | Barber et al. |
| 6,516,272 B2 | 2/2003 | Lin |
| 6,516,283 B2 | 2/2003 | McCall et al. |
| 6,520,056 B1 | 2/2003 | Nemeth et al. |
| 6,525,674 B1 | 2/2003 | Kelly et al. |
| 6,531,669 B1 | 3/2003 | Miller et al. |
| 6,549,161 B1 | 4/2003 | Woodell |
| 6,567,728 B1 | 5/2003 | Kelly et al. |
| 6,574,030 B1 | 6/2003 | Mosier |
| 6,577,947 B1 | 6/2003 | Kronfeld et al. |
| 6,590,528 B1 | 7/2003 | DeWulf |
| 6,591,171 B1 | 7/2003 | Ammar et al. |
| 6,593,875 B2 | 7/2003 | Bergin et al. |
| 6,600,443 B2 | 7/2003 | Landt |
| 6,603,425 B1 | 8/2003 | Woodell |
| 6,614,057 B2 | 9/2003 | Silvernail et al. |
| 6,650,275 B1 | 11/2003 | Kelly et al. |
| 6,650,291 B1 | 11/2003 | West et al. |
| 6,653,947 B2 | 11/2003 | Dwyer et al. |
| 6,667,710 B2 | 12/2003 | Cornell et al. |
| 6,681,668 B1 | 1/2004 | Smirle |
| 6,690,298 B1 | 2/2004 | Barber et al. |
| 6,690,299 B1 | 2/2004 | Suiter |
| 6,690,317 B2 | 2/2004 | Szeto et al. |
| 6,697,008 B1 | 2/2004 | Sternowski |
| 6,697,012 B2 | 2/2004 | Lodwig et al. |
| 6,710,663 B1 | 3/2004 | Berquist |
| 6,714,186 B1 | 3/2004 | Mosier et al. |
| 6,724,344 B1 | 4/2004 | Stockmaster et al. |
| 6,731,236 B1 | 5/2004 | Hager et al. |
| 6,738,011 B1 | 5/2004 | Evans |
| 6,739,929 B2 | 5/2004 | Furukawa et al. |
| 6,741,203 B1 | 5/2004 | Woodell |
| 6,741,208 B1 | 5/2004 | West et al. |
| 6,744,382 B1 | 6/2004 | Lapis et al. |
| 6,744,408 B1 | 6/2004 | Stockmaster |
| 6,757,624 B1 | 6/2004 | Hwang et al. |
| 6,760,155 B2 | 7/2004 | Murayama et al. |
| 6,771,626 B1 | 8/2004 | Golubiewski et al. |
| 6,782,392 B1 | 8/2004 | Weinberger et al. |
| 6,799,095 B1 | 9/2004 | Owen et al. |
| 6,803,245 B2 | 10/2004 | Auch et al. |
| 6,804,614 B1 | 10/2004 | McGraw et al. |
| 6,806,846 B1 | 10/2004 | West |
| 6,807,538 B1 | 10/2004 | Weinberger et al. |
| 6,813,777 B1 | 11/2004 | Weinberger et al. |
| 6,819,983 B1 | 11/2004 | McGraw |
| 6,822,617 B1 | 11/2004 | Mather et al. |
| 6,825,804 B1 | 11/2004 | Doty |
| 6,832,538 B1 | 12/2004 | Hwang |
| 6,839,017 B1 | 1/2005 | Dillman |
| 6,842,288 B1 | 1/2005 | Liu et al. |
| 6,850,185 B1 | 2/2005 | Woodell |
| 6,862,323 B1 | 3/2005 | Loper |
| 6,862,501 B2 | 3/2005 | He |
| 6,865,452 B2 | 3/2005 | Burdon |
| 6,879,280 B1 | 4/2005 | Bull et al. |
| 6,879,886 B2 | 4/2005 | Wilkins et al. |
| 6,882,302 B1 | 4/2005 | Woodell et al. |
| 6,908,202 B2 | 6/2005 | Graf et al. |
| 6,917,396 B2 | 7/2005 | Hiraishi et al. |
| 6,918,134 B1 | 7/2005 | Sherlock et al. |
| 6,933,885 B1 | 8/2005 | Stockmaster et al. |
| 6,938,258 B1 | 8/2005 | Weinberger et al. |
| 6,950,062 B1 | 9/2005 | Mather et al. |
| 6,959,057 B1 | 10/2005 | Tuohino |
| 6,972,727 B1 | 12/2005 | West et al. |
| 6,977,608 B1 | 12/2005 | Anderson et al. |
| 6,984,545 B2 | 1/2006 | Grigg et al. |
| 6,990,022 B2 | 1/2006 | Morikawa et al. |
| 6,992,614 B1 | 1/2006 | Joyce |
| 6,995,726 B1 | 2/2006 | West et al. |
| 6,998,648 B2 | 2/2006 | Silvernail |
| 6,998,908 B1 | 2/2006 | Sternowski |
| 6,999,022 B1 | 2/2006 | Vesel et al. |
| 6,999,027 B1 | 2/2006 | Stockmaster |
| 7,002,546 B1 | 2/2006 | Stuppi et al. |
| 7,010,398 B2 | 3/2006 | Wilkins et al. |
| 7,023,375 B2 | 4/2006 | Klausing et al. |
| 7,026,956 B1 | 4/2006 | Wenger et al. |
| 7,028,304 B1 | 4/2006 | Weinberger et al. |
| 7,030,945 B2 | 4/2006 | Umemoto et al. |
| 7,034,753 B1 | 4/2006 | Elsallal et al. |
| 7,042,387 B2 | 5/2006 | Ridenour et al. |
| 7,053,796 B1 | 5/2006 | Barber |
| 7,057,549 B2 | 6/2006 | Block |
| 7,064,680 B2 | 6/2006 | Reynolds et al. |
| 7,069,120 B1 | 6/2006 | Koenck et al. |
| 7,089,092 B1 | 8/2006 | Wood et al. |
| 7,092,645 B1 | 8/2006 | Sternowski |
| 7,098,913 B1 | 8/2006 | Etherington et al. |
| 7,109,912 B1 | 9/2006 | Paramore et al. |
| 7,109,913 B1 | 9/2006 | Paramore et al. |
| 7,123,260 B2 | 10/2006 | Brust |
| 7,129,885 B1 | 10/2006 | Woodell et al. |
| 7,145,501 B1 | 12/2006 | Manfred et al. |
| 7,148,816 B1 | 12/2006 | Carrico |
| 7,151,507 B1 | 12/2006 | Herting |
| 7,158,072 B1 | 1/2007 | Venkatachalam et al. |
| 7,161,525 B1 | 1/2007 | Finley et al. |
| 7,170,446 B1 | 1/2007 | West et al. |
| 7,170,959 B1 | 1/2007 | Abbey |
| 7,180,476 B1 | 2/2007 | Guell et al. |
| 7,191,406 B1 | 3/2007 | Barber et al. |
| 7,196,329 B1 | 3/2007 | Wood et al. |
| 7,205,933 B1 | 4/2007 | Snodgrass |
| 7,209,070 B2 | 4/2007 | Gilliland et al. |
| 7,212,216 B2 | 5/2007 | He et al. |
| 7,218,268 B2 | 5/2007 | VandenBerg |
| 7,219,011 B1 | 5/2007 | Barber |
| 7,242,343 B1 | 7/2007 | Woodell |
| 7,242,345 B2 | 7/2007 | Raestad et al. |
| 7,250,903 B1 | 7/2007 | McDowell |
| 7,265,710 B2 | 9/2007 | DeAgro |
| 7,269,657 B1 | 9/2007 | Alexander et al. |
| 7,272,472 B1 | 9/2007 | McElreath |
| 7,273,403 B2 | 9/2007 | Yokota et al. |
| 7,280,068 B2 | 10/2007 | Lee et al. |
| 7,289,058 B2 | 10/2007 | Shima |
| 7,292,178 B1 | 11/2007 | Woodell et al. |
| 7,292,180 B2 | 11/2007 | Schober |
| 7,295,150 B2 | 11/2007 | Burlet et al. |
| 7,295,901 B1 | 11/2007 | Little et al. |
| 7,301,496 B2 | 11/2007 | Honda et al. |
| 7,307,576 B1 | 12/2007 | Koenigs |
| 7,307,577 B1 | 12/2007 | Kronfeld et al. |
| 7,307,583 B1 | 12/2007 | Woodell et al. |
| 7,312,725 B2 | 12/2007 | Berson et al. |
| 7,312,743 B2 | 12/2007 | Ridenour et al. |
| 7,317,427 B2 | 1/2008 | Pauplis et al. |
| 7,321,332 B2 | 1/2008 | Focke et al. |
| 7,337,043 B2 | 2/2008 | Bull |
| 7,349,154 B2 | 3/2008 | Aiura et al. |
| 7,352,292 B2 | 4/2008 | Alter et al. |
| 7,361,240 B2 | 4/2008 | Kim |
| 7,372,394 B1 | 5/2008 | Woodell et al. |
| 7,373,223 B2 | 5/2008 | Murphy |
| 7,375,678 B2 | 5/2008 | Feyereisen et al. |
| 7,379,014 B1 | 5/2008 | Woodell et al. |
| 7,379,796 B2 | 5/2008 | Walsdorf et al. |

(56) References Cited

U.S. PATENT DOCUMENTS

| | | |
|---|---|---|
| 7,381,110 B1 | 6/2008 | Sampica et al. |
| 7,417,578 B1 | 8/2008 | Woodell et al. |
| 7,417,579 B1 | 8/2008 | Woodell |
| 7,423,578 B1 | 9/2008 | Tietjen |
| 7,446,697 B2 | 11/2008 | Burlet et al. |
| 7,446,938 B2 | 11/2008 | Miyatake et al. |
| 7,452,258 B1 | 11/2008 | Marzen et al. |
| 7,474,262 B2 | 1/2009 | Alland |
| 7,479,920 B2 | 1/2009 | Niv |
| 7,486,220 B1 | 2/2009 | Kronfeld et al. |
| 7,486,291 B2 | 2/2009 | Berson et al. |
| 7,492,304 B1 | 2/2009 | Woodell et al. |
| 7,492,305 B1 | 2/2009 | Woodell et al. |
| 7,515,087 B1 | 4/2009 | Woodell et al. |
| 7,515,088 B1 | 4/2009 | Woodell et al. |
| 7,525,448 B1 | 4/2009 | Wilson et al. |
| 7,528,765 B1 | 5/2009 | Woodell et al. |
| 7,528,915 B2 | 5/2009 | Choi et al. |
| 7,541,970 B1 | 6/2009 | Godfrey et al. |
| 7,541,971 B1 | 6/2009 | Woodell et al. |
| 7,551,451 B2 | 6/2009 | Kim et al. |
| 7,557,735 B1 | 7/2009 | Woodell et al. |
| 7,566,254 B2 | 7/2009 | Sampica et al. |
| 7,570,177 B2 | 8/2009 | Reynolds et al. |
| 7,576,680 B1 | 8/2009 | Woodell |
| 7,603,209 B2 * | 10/2009 | Dwyer .................. G01C 23/00 340/967 |
| 7,609,200 B1 | 10/2009 | Woodell et al. |
| 7,612,706 B2 | 11/2009 | Honda et al. |
| 7,616,150 B1 | 11/2009 | Woodell |
| 7,633,428 B1 | 12/2009 | McCusker et al. |
| 7,633,430 B1 | 12/2009 | Wichgers et al. |
| 7,633,584 B2 | 12/2009 | Umemoto et al. |
| 7,639,175 B1 | 12/2009 | Woodell |
| 7,664,601 B2 | 2/2010 | Daly, Jr. |
| 7,675,461 B1 | 3/2010 | McCusker et al. |
| 7,693,621 B1 | 4/2010 | Chamas |
| 7,696,921 B1 | 4/2010 | Finley et al. |
| 7,714,767 B1 | 5/2010 | Kronfeld et al. |
| 7,733,264 B1 | 6/2010 | Woodell et al. |
| 7,783,427 B1 | 8/2010 | Woodell et al. |
| 7,783,429 B2 | 8/2010 | Walden et al. |
| 7,791,529 B2 | 9/2010 | Filias et al. |
| 7,808,422 B1 | 10/2010 | Woodell et al. |
| 7,814,676 B2 | 10/2010 | Sampica et al. |
| 7,843,380 B1 | 11/2010 | Woodell |
| 7,859,448 B1 | 12/2010 | Woodell et al. |
| 7,859,449 B1 | 12/2010 | Woodell et al. |
| 7,864,103 B2 | 1/2011 | Weber et al. |
| 7,868,811 B1 | 1/2011 | Woodell et al. |
| 7,872,594 B1 | 1/2011 | Vesel |
| 7,889,117 B1 | 2/2011 | Woodell et al. |
| 7,889,118 B1 | 2/2011 | Finley et al. |
| 7,927,440 B2 | 4/2011 | Matsuhira |
| 7,929,086 B2 | 4/2011 | Toyama et al. |
| 7,965,223 B1 | 6/2011 | McCusker |
| 7,965,225 B1 | 6/2011 | Dickerson et al. |
| 8,035,547 B1 | 10/2011 | Flanigan et al. |
| 8,038,498 B2 | 10/2011 | Miyauchi et al. |
| 8,045,098 B2 | 10/2011 | Kitagawa et al. |
| 8,059,025 B2 | 11/2011 | D'Addio |
| 8,068,984 B2 | 11/2011 | Smith et al. |
| 8,072,368 B1 | 12/2011 | Woodell |
| 8,077,078 B1 | 12/2011 | Woodell et al. |
| 8,102,487 B2 | 1/2012 | Kitagawa et al. |
| 8,118,075 B2 | 2/2012 | Sampica et al. |
| 8,137,498 B2 | 3/2012 | Sampica et al. |
| 8,140,223 B2 | 3/2012 | Whitehead et al. |
| 8,159,464 B1 | 4/2012 | Gribble et al. |
| 8,232,917 B2 | 7/2012 | Scherzinger et al. |
| 8,296,065 B2 | 10/2012 | Haynie et al. |
| 8,373,580 B2 | 2/2013 | Bunch et al. |
| 8,410,975 B1 | 4/2013 | Bell et al. |
| 8,477,062 B1 | 7/2013 | Kanellis |
| 8,486,535 B1 | 7/2013 | Nemeth et al. |
| 8,493,241 B2 | 7/2013 | He |
| 8,515,600 B1 | 8/2013 | McCusker |
| 8,540,002 B2 | 9/2013 | Sampica et al. |
| 8,558,731 B1 | 10/2013 | Woodell |
| 8,576,112 B2 | 11/2013 | Garrec et al. |
| 8,583,315 B2 | 11/2013 | Whitehead et al. |
| 8,594,879 B2 | 11/2013 | Roberge et al. |
| 8,603,288 B2 | 12/2013 | Sampica et al. |
| 8,634,993 B2 | 1/2014 | McClure et al. |
| 8,639,416 B2 | 1/2014 | Jones et al. |
| 8,643,533 B1 | 2/2014 | Woodell et al. |
| 8,691,043 B2 | 4/2014 | Sampica et al. |
| 8,717,226 B2 | 5/2014 | Bon et al. |
| 8,936,057 B2 | 1/2015 | Sampica et al. |
| 2001/0050372 A1 | 12/2001 | Krijn et al. |
| 2001/0053648 A1 | 12/2001 | Furukawa et al. |
| 2002/0039070 A1 | 4/2002 | Ververs et al. |
| 2002/0111717 A1 | 8/2002 | Scherzinger et al. |
| 2002/0116125 A1 | 8/2002 | Lin |
| 2002/0116126 A1 | 8/2002 | Lin |
| 2002/0158256 A1 | 10/2002 | Yamada et al. |
| 2002/0179229 A1 | 12/2002 | Chuzles |
| 2002/0185600 A1 | 12/2002 | Kerr |
| 2002/0187284 A1 | 12/2002 | Kinoshita et al. |
| 2003/0021491 A1 | 1/2003 | Brust |
| 2003/0038916 A1 | 2/2003 | Nakano et al. |
| 2003/0043315 A1 | 3/2003 | Umemoto et al. |
| 2003/0071828 A1 | 4/2003 | Wilkins et al. |
| 2003/0089214 A1 | 5/2003 | Fukuta et al. |
| 2003/0093187 A1 | 5/2003 | Walker |
| 2003/0102999 A1 | 6/2003 | Bergin et al. |
| 2003/0156238 A1 | 8/2003 | Hiraishi et al. |
| 2003/0160718 A1 | 8/2003 | Nagasaku |
| 2003/0174396 A1 | 9/2003 | Murayama et al. |
| 2003/0180528 A1 | 9/2003 | Flosenzier et al. |
| 2003/0189606 A1 | 10/2003 | Moon et al. |
| 2003/0195672 A1 | 10/2003 | He |
| 2003/0216859 A1 | 11/2003 | Martell et al. |
| 2003/0222887 A1 | 12/2003 | Wilkins et al. |
| 2004/0044445 A1 | 3/2004 | Burdon |
| 2004/0059473 A1 | 3/2004 | He |
| 2004/0066645 A1 | 4/2004 | Graf et al. |
| 2004/0072575 A1 | 4/2004 | Young et al. |
| 2004/0083038 A1 | 4/2004 | He |
| 2004/0160341 A1 | 8/2004 | Feyereisen et al. |
| 2004/0160364 A1 | 8/2004 | Regev |
| 2004/0181318 A1 | 9/2004 | Redmond et al. |
| 2004/0264549 A1 | 12/2004 | Hoole |
| 2005/0004748 A1 | 1/2005 | Pinto et al. |
| 2005/0052451 A1 | 3/2005 | Servantie |
| 2005/0126679 A1 | 6/2005 | Kim |
| 2005/0136625 A1 | 6/2005 | Henseler et al. |
| 2005/0174350 A1 | 8/2005 | Ridenour et al. |
| 2005/0200502 A1 | 9/2005 | Reusser et al. |
| 2005/0230563 A1 | 10/2005 | Corcoran |
| 2006/0004497 A1 | 1/2006 | Bull |
| 2006/0097895 A1 | 5/2006 | Reynolds et al. |
| 2006/0098452 A1 | 5/2006 | Choi et al. |
| 2006/0164284 A1 | 7/2006 | Pauplis et al. |
| 2006/0207967 A1 | 9/2006 | Bocko et al. |
| 2006/0215265 A1 | 9/2006 | Miyatake et al. |
| 2006/0227012 A1 | 10/2006 | He |
| 2006/0244636 A1 | 11/2006 | Rye et al. |
| 2006/0245171 A1 | 11/2006 | Kim et al. |
| 2006/0290253 A1 | 12/2006 | Yeo et al. |
| 2006/0290531 A1 | 12/2006 | Reynolds et al. |
| 2007/0001897 A1 | 1/2007 | Alland |
| 2007/0002078 A1 | 1/2007 | He et al. |
| 2007/0008214 A1 | 1/2007 | Wasiewicz |
| 2007/0013575 A1 | 1/2007 | Lee et al. |
| 2007/0018887 A1 | 1/2007 | Feyereisen et al. |
| 2007/0032951 A1 | 2/2007 | Tanenhaus et al. |
| 2007/0060063 A1 | 3/2007 | Wright et al. |
| 2007/0146364 A1 | 6/2007 | Aspen |
| 2007/0171094 A1 | 7/2007 | Alter et al. |
| 2007/0176794 A1 | 8/2007 | Feyereisen et al. |
| 2007/0228586 A1 | 10/2007 | Merrill et al. |
| 2007/0247350 A1 | 10/2007 | Ryan |
| 2007/0279253 A1 | 12/2007 | Priest |

(56) References Cited

U.S. PATENT DOCUMENTS

| | | | |
|---|---|---|---|
| 2007/0297736 | A1 | 12/2007 | Sherman et al. |
| 2008/0018524 | A1 | 1/2008 | Christianson |
| 2008/0051947 | A1 | 2/2008 | Kemp |
| 2008/0074308 | A1 | 3/2008 | Becker et al. |
| 2008/0111731 | A1 | 5/2008 | Hubbard et al. |
| 2008/0145610 | A1 | 6/2008 | Muller et al. |
| 2008/0180351 | A1 | 7/2008 | He |
| 2008/0305721 | A1 | 12/2008 | Ohashi et al. |
| 2009/0040070 | A1 | 2/2009 | Alter et al. |
| 2009/0040772 | A1 | 2/2009 | Laney |
| 2009/0046229 | A1 | 2/2009 | Umemoto et al. |
| 2009/0148682 | A1 | 6/2009 | Higuchi |
| 2009/0152391 | A1 | 6/2009 | McWhirk |
| 2009/0153783 | A1 | 6/2009 | Umemoto |
| 2009/0164067 | A1 | 6/2009 | Whitehead et al. |
| 2009/0207048 | A1 | 8/2009 | He et al. |
| 2009/0279030 | A1 | 11/2009 | Toyama et al. |
| 2009/0279175 | A1 | 11/2009 | Laney et al. |
| 2010/0033499 | A1 | 2/2010 | Gannon et al. |
| 2010/0103353 | A1 | 4/2010 | Yamada |
| 2010/0297406 | A1 | 11/2010 | Schaffer et al. |
| 2010/0312428 | A1 | 12/2010 | Roberge et al. |
| 2010/0312461 | A1 | 12/2010 | Haynie et al. |
| 2011/0054729 | A1 | 3/2011 | Whitehead et al. |
| 2011/0075070 | A1 | 3/2011 | Kitagawa et al. |
| 2011/0141405 | A1 | 6/2011 | Kitagawa et al. |
| 2011/0165361 | A1 | 7/2011 | Sherman et al. |
| 2011/0282580 | A1 | 11/2011 | Mohan |
| 2012/0053831 | A1 | 3/2012 | Halder |
| 2012/0150426 | A1 | 6/2012 | Conway |
| 2012/0174445 | A1 | 7/2012 | Jones et al. |
| 2012/0215410 | A1 | 8/2012 | McClure et al. |
| 2013/0041529 | A1* | 2/2013 | He .................. G08G 5/025 701/17 |

FOREIGN PATENT DOCUMENTS

| | | | |
|---|---|---|---|
| EP | 0 962 752 A1 | 12/1999 | |
| GB | 0 814 744 A | 6/1959 | |
| JP | 01-210328 | 8/1989 | |
| JP | 05-200880 | 8/1993 | |
| JP | 05-293895 | 11/1993 | |
| JP | 06-051484 | 2/1994 | |
| JP | H08-220547 A | 8/1996 | |
| JP | 09-057779 | 3/1997 | |
| JP | 10-156853 | 6/1998 | |
| JP | 10-244589 | 9/1998 | |
| JP | 2000-141388 | 5/2000 | |
| JP | 2004-233590 | 8/2004 | |
| JP | 2004-354645 | 12/2004 | |
| JP | 2006-218658 | 8/2006 | |
| JP | 2006-334912 | 12/2006 | |
| JP | 2006-348208 | 12/2006 | |
| JP | 2007-206559 | 8/2007 | |
| JP | 2008-238607 | 1/2008 | |
| WO | WO-93/05634 | 3/1993 | |
| WO | WO-2011/089474 A2 | 7/2011 | |

OTHER PUBLICATIONS

Brailovsky et al., REVS122: A Radar-Based Enhanced Vision System for Degraded Visual Environments, Proc. of SPIE vol. 9087 908708-1, retrieved from the internet at http://proceedings.spiedigitallibrary.org on Jun. 25, 2014, 13 pages.

Federal Aviation Administration, Advisory Circular AC 90-106, "Enhanced Flight Vision Systems", initiated by AFS-400, dated Jun. 2, 2010, 55 pages.

Federal Aviation Administration, Aeronautical Information Manual (AIM) Basic Flight Information and ATC Procedures, dated Jul. 24, 2014, 2 pages.

Fountain, J.R., Digital Terrain Systems, Airborne Navigation Systems Workshop (Digest No. 1997/169), IEE Colloquium, pp. 4/1-4/6, Feb. 21, 1997.

Honeywell, RDR-4B Forward looking windshear detection / weather radar system user's manual with radar operating guidelines, Rev. 6, Jul. 2003, 106 pages.

Johnson, A., et al., Vision Guided Landing of an Autonomous Helicopter in Hazardous Terrain, Robotics and Automation, 2005. ICRA 2005. Proceedings of the 2005 IEEE International Conference, pp. 3966-3971, Apr. 18-22, 2005.

Kuntman, D., Airborne system to address leading cause of injuries in non-fatal airline accidents, ICAO Journal, Mar. 2000, 4 pages.

Notice of Allowance for U.S. Appl. No. 11/863,221, mail date Aug. 2, 2010, 9 pages.

Notice of Allowance for U.S. Appl. No. 11/899,801, mail date Aug. 19, 2010, 5 pages.

U.S. Appl. No. 12/236,464, filed Sep. 23, 2008, Rockwell Collins.

U.S. Appl. No. 13/627,788, filed Sep. 26, 2012, Rockwell Collins.

U.S. Appl. No. 13/250,798, filed Sep. 30, 2011, Rockwell Collins.

U.S. Appl. No. 14/301,199, filed Jun. 10, 2014, Rockwell Collins.

U.S. Appl. No. 14/482,681, filed Sep. 10, 2014, Rockwell Collins.

Notice of Allowance for U.S. Appl. No. 11/900,002, mail date Sep. 14, 2010, 5 pages.

Notice of Allowance for U.S. Appl. No. 12/167,200, mail date Oct. 28, 2010, 5 pages.

Notice of Allowance for U.S. Appl. No. 12/167,203, mail date Jun. 21, 2013, 7 pages.

Notice of Allowance for U.S. Appl. No. 12/167,208, mail date Mar. 21, 2011, 8 pages.

Notice of Allowance for U.S. Appl. No. 12/180,293, mail date Aug. 4, 2011, 8 pages.

Notice of Allowance on U.S. Appl. No. 13/241,051 Dated Aug. 28, 2014, 9 pages.

Notice of Allowance on U.S. Appl. No. 13/247,742 Dated Jul. 30, 2014, 9 pages.

Office Action for U.S. Appl. No. 11/851,323, mail date Aug. 6, 2009, 23 pages.

Office Action for U.S. Appl. No. 11/851,323, mail date Dec. 15, 2010, 13 pages.

Office Action for U.S. Appl. No. 11/851,323, mail date Jul. 5, 2012, 23 pages.

Office Action for U.S. Appl. No. 12/167,200, mail date Jul. 21, 2010, 6 pages.

Office Action for U.S. Appl. No. 12/167,203, mail date Aug. 26, 2010, 11 pages.

Office Action for U.S. Appl. No. 12/167,203, mail date Sep. 21, 2012, 6 pages.

Office Action for U.S. Appl. No. 12/167,208, mail date Dec. 30, 2009, 10 pages.

Office Action for U.S. Appl. No. 12/167,208, mail date Jun. 3, 2011, 11 pages.

Office Action for U.S. Appl. No. 12/167,208, mail date Oct. 19, 2010, 8 pages.

Office Action for U.S. Appl. No. 12/180,293, mail date Jan. 4, 2011, 5 pages.

Office Action for U.S. Appl. No. 12/180,293, mail date Jul. 28, 2010, 8 pages.

Office Action for U.S. Appl. No. 12/976,871, mail date Feb. 15, 2012, 8 pages.

Office Action for U.S. Appl. No. 12/976,871, mail date Jul. 10, 2012, 4 pages.

Office Action for U.S. Appl. No. 12/976,871, mail date May 6, 2013, 5 pages.

Office Action for U.S. Appl. No. 12/976,871, mail date Nov. 21, 2012, 5 pages.

Office Action for U.S. Appl. No. 12/976,871, mail date Oct. 9, 2013, 5 pages.

Office Action for U.S. Appl. No. 13/183,314, mail date Aug. 14, 2013, 11 pages.

Office Action for U.S. Appl. No. 13/183,314, mail date Mar. 28, 2013, 12 pages.

Office Action for U.S. Appl. No. 13/474,559, mail date Aug. 28, 2013, 10 pages.

Office Action for U.S. Appl. No. 13/474,559, mail date Dec. 28, 2012, 8 pages.

(56) References Cited

OTHER PUBLICATIONS

Office Action on U.S. Appl. No. 13/241,051 Dated Feb. 27, 2014, 21 pages.
Office Action on U.S. Appl. No. 13/247,742 Dated Dec. 3, 2013, 11 pages.
REVS Product Information Sheet, Sierra Nevada Corporation, dated May 7, 2014, 2 pages.
SKOLNIK, Introduction Radar Systems, McGraw Hill Book Company, 2001, 3 pages.
SKOLNIK, Radar Handbook (McGraw Hill Book Company), 1990, 23 pages.
Technical Standard Order, TSO-C115b, Airborne Area Navigation Equipment Using Multi-Sensor Inputs. Department of Transportation, Federal Aviation Administration, Sep. 30, 1994, 11 pages.
US Office Action on U.S. Appl. No. 11/900,002 Dated Jun. 8, 2010.
U.S. Office Action on U.S. Appl. No. 13/247,742 Dated Apr. 16, 2014, 15 pages.
Vadiamani, A., et al., Improving the detection capability of spatial failure modes using downward looking sensors in terrain database integrity monitors, Digital Avionics Systems Conference, 2003. DASC-03. The 22nd, vol. 2, pp. 9C.5-91-12 vol. 2, Oct. 12-16, 2003.
Wang et al., A Simple Based on DSP Antenna Controller of Weather Radar, 2001 CIE International Conference, 4 pages.
U.S. Appl. No. 13/857,955, filed Apr. 5, 2013, Barber et al.
Synthetic Vision System, en.wikipedia.org/wiki/Synthetic_vision_system, retrieved Feb. 28, 2013, 4 pages.
U.S. Appl. No. 11/851,323, filed Sep. 6, 2007, McCusker.
U.S. Appl. No. 11/863,219, filed Sep. 27, 2007, Woodell.
U.S. Appl. No. 11/863,221, filed Sep. 27, 2007, Woodell.
U.S. Appl. No. 11/899,801, filed Sep. 6, 2007, Woodell et al.
U.S. Appl. No. 11/900,002, filed Sep. 6, 2007, Woodell et al.
U.S. Appl. No. 12/167,200, filed Jul. 2, 2008, Woodell et al.
U.S. Appl. No. 12/167,203, filed Jul. 2, 2008, Woodell.
U.S. Appl. No. 12/167,208, filed Jul. 2, 2008, Dickerson et al.
U.S. Appl. No. 12/180,293, filed Jul. 25, 2008, Woodell et al.
U.S. Appl. No. 12/786,169, filed May 24, 2010, Nemeth et al.
U.S. Appl. No. 13/224,992, filed Sep. 2, 2011, Hufnagel et al.
U.S. Appl. No. 13/250,307, filed Sep. 30, 2011, Jinkins.
U.S. Appl. No. 13/250,798, filed Sep. 30, 2011, Jinkins.
"MountainScope™ on a TabletPC," PCAvionics™, printed from website www.pcavionics.com on Aug. 28, 2007, 1 page.
TAWS CLASS A and CLASS B, Terrain Awareness and Warning Systems, Universal® Avionics Systems Corporation, Sep. 2007, 6 pages.
"TAWS Terrain Awareness and Warning System," Universal® Avionics, printed from website www.uasc.com on Aug. 28, 2007, 2 pages.
Adams, Charlotte, "Synthetic Vision: Picturing the Future," Avionics magazine, Oct. 1, 2006, printed from website www.aviationtoday.com, 4 pages.
Adams, Charlotte, "Synthetic Vision: Picturing the Future," Avionics magazine, Solutions for Global Airspace Electronics, Oct. 2006, cover and pp. 22-29.
Advisory Action for U.S. Appl. No. 12/009,472, mail date Feb. 25, 2013, 3 pages.
Advisory Action for U.S. Appl. No. 13/538,957, mail date Jun. 14, 2013, 6 pages.
Blue Mountain Avionics' Products, printed from website www.bluemountainavionics.com on Aug. 28, 2007, 4 pages.
Carter, S. P., D. D. Blankenship, M. E. Peters, D. A. Young, J. W. Holt, and D. L. Morse (2007), Radar-Based subglacial lake classification in Antarctica, Geochem, Geophys, Geosyst., 8, 003016, doi:10 1029/2006GC001408, 20 pages.
Final Office Action on U.S. Appl. No. 13/250,798 dated Sep. 4, 2014, 22 pages.
Final Office Action on U.S. Appl. No. 13/867,556 Dated Jul. 3, 2014, 11 pages.
Final Office Action on U.S. Appl. No. 13/250,307 Dated Jun. 11, 2014, 8 pages.
Final Office Action on U.S. Appl. No. 13/250,798 Dated Aug. 7, 2015, 21 pages.
G2000, Garmin, printed from website https://buy.garmin.com/shop/shop.do?cID=153&pID=97668 on Jun. 28, 2011, 2 pages.
G3000, Garmin, printed from website https://buy.garmin.com/shop/shop.do?cID=153&pID=66916 on Jun. 28, 2011, 2 pages.
G5000, Garmin, printed from website https://buy.garmin.com/shop.do?cID=153&pID=90821&ra=true on Apr. 20, 2011, 2 pages.
Non-Final Office Action on U.S. Appl. No. 13/250,798 Dated Mar. 18, 2015, 21 pages.
Notice of Allowance for U.S. Appl. No. 12/009,372, mail date Oct. 13, 201, 8 pages.
Notice of Allowance for U.S. Appl. No. 12/009,373, mail date Jun. 16, 2010, 4 pages.
Notice of Allowance for U.S. Appl. No. 12/009,472, mail date Sep. 5, 2013, 8 pages.
Notice of Allowance for U.S. Appl. No. 12/786,169, mail date Mar. 28, 2013, 6 pages.
Notice of Allowance for U.S. Appl. No. 13/538,957, mail date Oct. 3, 2013, 13 pages.
Office Action for U.S. Appl. No. 12/009,372, mail date Dec. 20, 2010, 10 pages.
Office Action for U.S. Appl. No. 12/009,372, mail date Jun. 13, 2011, 9 pages.
Office Action for U.S. Appl. No. 12/009,373, mail date Dec. 30, 2009, 14 pages.
Office Action for U.S. Appl. No. 12/009,472, mail date Apr. 16, 2012, 16 pages.
Office Action for U.S. Appl. No. 12/009,472, mail date Jan. 14, 2011, 14 pages.
Office Action for U.S. Appl. No. 12/009,472, mail date Mar. 20, 2013, 15 pages.
Office Action for U.S. Appl. No. 12/009,472, mail date Nov. 3, 2011, 15 pages.
Office Action for U.S. Appl. No. 12/009,472, mail date Nov. 9, 2012, 15 pages.
Office Action for U.S. Appl. No. 12/263,282, mail date Jan. 5, 2012, 10 pages.
Office Action for U.S. Appl. No. 12/786,169, mail date Jan. 18, 2013, 14 pages.
Office Action for U.S. Appl. No. 12/892,563, mail date Feb. 19, 2013, 12 pages.
Office Action for U.S. Appl. No. 13/224,992, mail date Feb. 28, 2013, 10 pages.
Office Action for U.S. Appl. No. 13/250,307, mail date Nov. 5, 2013, 11 pages.
Office Action for U.S. Appl. No. 13/538,957, mail date Apr. 4, 2013, 19 pages.
Office Action for U.S. Appl. No. 13/538,957, mail date Oct. 5, 2012, 18 pages.
Office Action for U.S. Appl. No. 13/743,182, mail date Apr. 8, 2013, 10 pages.
Office Action for U.S. Appl. No. 12/786,169, mail date Jul. 20, 2012, 8 pages.
Office Action in Japanese Patent Application 2015-116688, dated Aug. 25, 2015, 4 pages.
Office Action in Japanese Patent Application 2015-116716, dated Aug. 25, 2015, 3 pages.
Office Action on U.S. Appl. No. 12/236,464, mail date Feb. 11, 2014, 21 pages.
Office Action on U.S. Appl. No. 12/236,464, mail date Jun. 22, 2011, 14 pages.
Office Action on U.S. Appl. No. 13/250,798 Dated Apr. 23, 2014, 15 pages.
Office Action on U.S. Appl. No. 13/867,556 Dated Feb. 7, 2014, 11 pages.
Office Action U.S. Appl. No. 11/787,460, mail date Aug. 31, 2010, 18 pages.
Office Action with English Translation received in Korean Patent Application 10-2010-7017278, dated Aug. 26, 2015, 5 pages.
Pictures of DELPHINS, printed from website www.tunnel-in-the-sky.tudelft.nl on Aug. 28, 2007, 4 pages.

(56) References Cited

OTHER PUBLICATIONS

Restriction Requirement for U.S. Appl. No. 13/867,556, mail date Dec. 26, 2013, 6 pages.
Van Kasteren, Joost, "Tunnel-in-the-Sky, Synthetic vision simplifies the pilot's job and enhances safety," printed from website www.delfoutlook.tudelft.nl on Aug. 28, 2007, 13 pages.
Walker, GD-Itronix Dynavue Technology, The Ultimate Outdoor-Readable Touch-Screen Display, Rugged PC Review, 4 pages.
Non-Final Office Action on U.S. Appl. No. 13/250,798 dated Feb. 26, 2016, 9 pages.
Notice of Allowance on U.S. Appl. No. 12/263,282 dated Jan. 29, 2016, 8 pages.

* cited by examiner

ENHANCED FLIGHT VISION SYSTEM AND METHOD WITH RADAR SENSING AND PILOT MONITORING DISPLAY

CROSS-REFERENCE TO RELATED PATENT APPLICATIONS

The present application is related to U.S. patent application Ser. No. 13/857,955 filed on Apr. 5, 2013 by Barber et al., entitled "Extended Runway Centerline Systems And Methods," which is assigned to the assignee of the present application and incorporated herein by reference.

BACKGROUND

An enhanced flight vision system (EFVS) is sometimes used in by an aircraft flight crew in order to provide imagery of an airport terminal area and runway environment to a flight crew during times when meteorological conditions prevent a clear natural view of the of the external surroundings of the aircraft through the windscreen. For example, the EFVS may overlay an image of an airport terminal area and runway environment over the pilot's natural unaided view of the external surroundings of the aircraft through the aircraft's cockpit windscreen. Such imagery may improve the situation awareness of the flight crew during instrument approach procedures in low visibility conditions such as fog. For example, under Title 14 of the Code of Federal Regulations, part 91, a pilot may not descend below decision altitude (DA) or minimum descent altitude (MDA) to 100 feet above the touchdown zone elevation (TDZE) from a straight-in instrument approach procedure (IAP), other than Category II or Category III, unless the pilot can see certain required visual references. Such visual references include, for example, the approach lighting system, the threshold lighting system, and the runway edge lighting system. The pilot may, however, use an EFVS to identify the required visual references in low visibility conditions where the pilots natural unaided vision is unable to identify these visual references. Accordingly, the use of an EFVS may minimize losses due to the inability of the pilot to land the plane and deliver cargo and/or passengers on time in low visibility conditions.

EFVS imagery is typically presented to the pilot flying (PF) on a head up display (HUD). The HUD is typically a transparent display device that allows the PF to view EFVS imagery while looking at the external surroundings of the aircraft through the cockpit windscreen. As long as visibility conditions outside of the aircraft permit the PF to see the external surroundings of the aircraft through the cockpit windscreen, the PF can verify that the EFVS is functioning properly such that the imagery on the HUD is in alignment with the PF's view of the external surroundings of the aircraft.

EFVS imagery is sometimes also presented to the pilot monitoring (PM) on a head down display (HDD). For example, in some countries, the system must present the EFVS imagery to the PM for confirmation that the EFVS information is a reliable and accurate indicator of the required visual references. The PM may also use the EFVS imagery to determine whether the PF is taking appropriate action during approach and landing procedures. The HDD is typically a non-transparent display device mounted adjacent to or within a console or instrument panel of the aircraft. The HDD is typically positioned such that the PM must look away from the cockpit windscreen in order to see the displayed imagery, and the PM is unable to see the external surroundings of the aircraft through the cockpit windscreen while viewing the HDD. As such, the HDD does not overlay the EFVS image over the PM's natural unaided view of the external surroundings of the aircraft. Without the context of the external surroundings, it is very difficult for the PM to detect problems in the EFVS imagery beyond gross failures such as loss of image or white-out images.

An EFVS typically uses either a passive or active sensing system to acquire data used to generate imagery of the airport terminal area and runway environment. A typical passive sensor, such as a forward looking infrared (FLIR) camera or visible light spectrum camera, receives electromagnetic energy from the environment and outputs data that may be used by the system to generate video images from the point of view of the camera. The camera is installed in an appropriate position, such as in the nose of an aircraft, so that the PF may be presented with an appropriately scaled and positioned video image on the HUD having nearly the same point of view as the PF when viewing the external surroundings of the aircraft through the HUD. However, while passive sensors provide higher quality video imagery, they may be unable to identify required visual references in certain low visibility conditions such as heavy fog.

Active sensing systems, such as millimeter wavelength radar systems (e.g., 94 GHz), transmit electromagnetic energy into the environment and then receive return electromagnetic energy reflected from the environment. The active sensing system is typically installed in an appropriate position, such as in the nose of an aircraft. Active sensing systems do not generate the same video imagery as passive sensing systems, but rather map the received return energy into three-dimensional (3-D) models (e.g., using a polar coordinate system with range, azimuth and elevation from the nose of an aircraft). The 3-D model may then be rendered into a two-dimensional (2-D) image that may be appropriately scaled, positioned, and presented to the PF on the HUD in much the same way as video imagery from a passive sensing system. However, while active millimeter wavelength radar systems provide better identification of required visual references than passive sensing systems in low visibility conditions such as heavy fog, the quality of the imagery is not as good.

Additionally, both passive FLIR cameras and active millimeter wavelength radar systems may have limited range in certain low visibility conditions such as heavy fog. Furthermore, regardless of the sensor technology used, current EFVS designs generate image views that are positioned and scaled with respect to a point of view useful for a PF using a HUD and having additional the additional context of the external surroundings of the aircraft while looking through the cockpit windscreen. The EFVS images are not rescaled or repositioned or provided with any additional flight information symbology or situational context for use by a PM when viewed on an HDD. Such EFVS images alone are of limited used to a PM using an HDD to verify the reliability and accuracy of the EFVS and/or to determine that the PF is taking appropriate action during approach and landing procedures. There is an ongoing need for an improved EFVS having a sensing system tuned to identify visual references required for aircraft approach and landing in low visibility conditions with sufficient accuracy and range. There is yet further need for an improved EFVS capable of providing imagery on an HDD that is useful to a PM to verify the reliability and accuracy of the EFVS, and to determine that the PF is taking appropriate action during approach and landing procedures.

SUMMARY

According to an exemplary embodiment, an image processing system for enhanced flight vision includes a processor and memory coupled to the processor. The memory contains program instructions that, when executed, cause the processor to receive radar returns data for a runway structure, generate a three-dimensional model representative of the runway structure based on the radar returns data, generate a two-dimensional image of the runway structure from the three-dimensional model, and generate an aircraft situation display image representative of the position of the runway structure with respect to an aircraft based on the two-dimensional image.

According to another exemplary embodiment, a method of providing enhanced flight vision includes receiving radar returns data for a runway structure, generating a three-dimensional model representative of the runway structure based on the radar returns data, generating a two-dimensional image of the runway structure from the three-dimensional model, and generating an aircraft situation display image representative of the position of the runway structure based on the two-dimensional image.

According to another exemplary embodiment, an enhanced flight vision system includes a Doppler weather radar system including an antenna and a transducer configured to enhance reflectivity of radar returns from runway structures, processing electronics in communication with the weather radar system and configured to generate two-dimensional aircraft situation display images representative of the position of the runway structures based on the radar returns, and a display in communication with the processing electronics and configured to display the images to a pilot monitoring.

DETAILED DESCRIPTION

Figure 1:
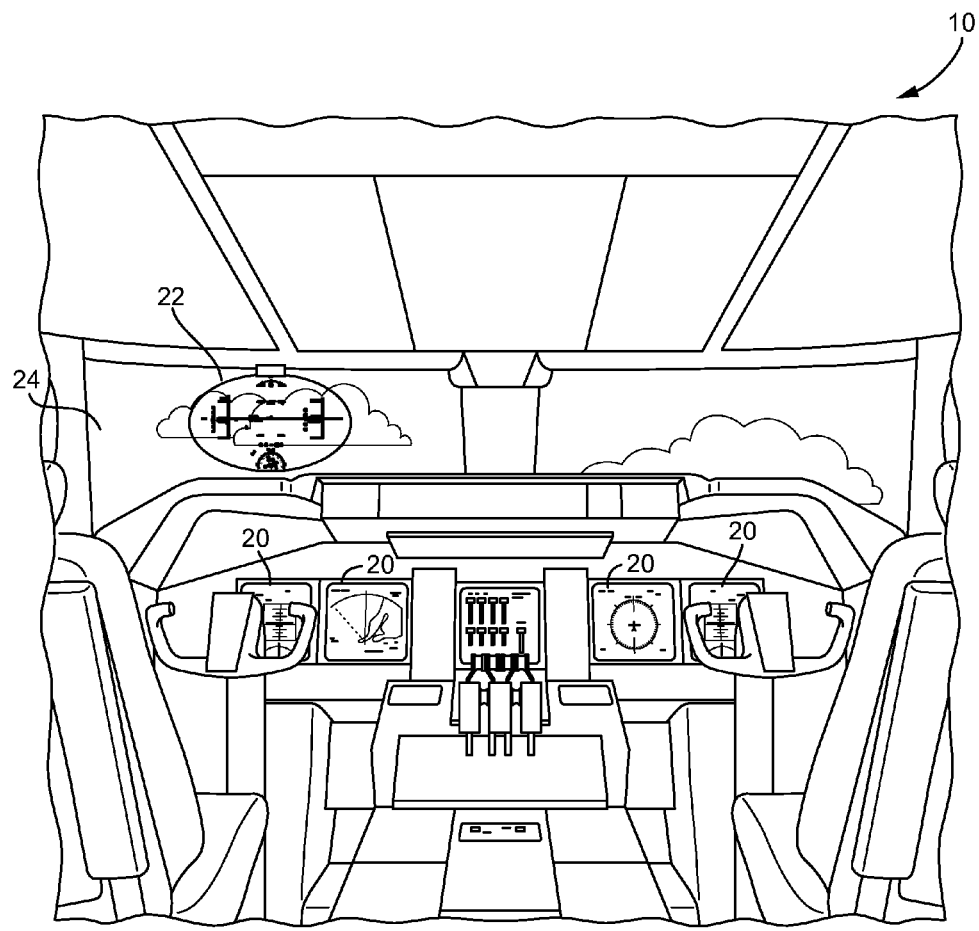
FIG. 1 is a perspective view schematic of an exemplary aircraft control center or cockpit.

According to various exemplary embodiments, an EFVS may be provided with radar sensing and imagery displayable to a PM on an aircraft display, such as an HDD. For example, the EFVS may include a Doppler weather radar system including an antenna and a transducer. The Doppler weather radar system may be configured to enhance reflectivity of radar returns from runway structures in an airport terminal or runway environment, such as an approach lighting system, a threshold lighting system, and or a runway edge lighting system. As will be appreciated, using a Doppler weather radar system configured according to the various exemplary embodiments of an EFVS disclosed herein may provide greater range than millimeter wavelength radar sensing systems or passive FLIR or visible light camera systems in low visibility conditions such as heavy fog, given the Doppler weather radar system's superior ability to penetrate heavy fog. Using a Doppler weather radar system configured according to the various exemplary embodiments may also provide EFVS imagery having sufficient accuracy in low visibility conditions given that many of the visual references required under Title 14 of the Code of Federal Regulations, part 91, such as approach lighting systems, threshold lighting systems, runway edge lighting systems, and other runway structures are metallic structures that exhibit high radar reflectivity.

The EFVS may also include a radar processing module in communication with the radar system and configured to generate two-dimensional aircraft situation display images representative of the position of runway structures in an airport terminal or runway environment based on the radar returns. For example, the radar processing module may include an image processing system having a processor and memory containing program instructions that, when executed, cause the processor to receive radar returns data for runway structures and generate a 3-D model representative of the runway structures based on the radar returns data. The program instructions may also be configured to cause the processor to filter the radar returns data to identify areas in the 3-D model having a reflectivity lower than a predetermined value. As will be appreciated, generating a 3-D model representative of the runway structure from active radar return data provides range and/or depth information to the EFVS and allows for 2-D imagery to be produced with multiple viewpoints as opposed to a single point of view aligned with that of the PF looking at the external surroundings of the aircraft through the cockpit windscreen.

The program instructions may also be configured to generate a 2-D image of the runway structure in an airport terminal or runway environment from the 3-D model. For example, the 2-D image may be a top-down or side view of the runway structure. The program instructions may also be configured to generate an aircraft situation display image representative of the position of the runway structure with respect to an aircraft based on the 2-D image. For example, the aircraft situation display image may include a 2-D electronic moving map display of an airport terminal or runway environment having an overlay including the 2-D radar image of the runway structure. In some embodiments, the aircraft situation display image may be a horizontal situation display image including a top-down view of the runway structure. In some embodiments, the aircraft situation display image may be a vertical situation display image including a side view of the runway structure. In some embodiments, both a horizontal and vertical situation displays may be presented.

The EFVS may also include a PM display in communication with the radar processing module and configured to display the images. For example, the PM display may be an HDD. The HDD may be configured to present 2-D aircraft situation display map images as opposed to a transparent HUD configured to overlay sensing system imagery over the pilot's natural unaided view of the external surroundings of the aircraft through the aircraft's cockpit windscreen. As will be appreciated, using a 2-D horizontal or vertical aircraft situation display, such as an electronic moving map display having an overlay including a 2-D top-down or side-view radar image provides the PM with context in which the reliability and accuracy of the EFVS may be determined, and within which the PM may determine that the PF is taking appropriate action during approach and landing procedures. For example, any misalignment between or among the overlays may indicate to the PM that there may be a problem with the aircraft navigation system, altimeter, radar system, an airport location database, the course selected by the PF, etc.

Referring now to FIG. 1, an exemplary aircraft control center 10 is shown. Aircraft control center 10 may include various flight displays used by the aircraft's pilot to increase visual range and enhance the pilot's situational awareness. As shown, aircraft control center 10 includes flight displays 20 and a HUD 22. HUD 22 may be located within aircraft control center 10 such that HUD 22 is directly within the pilot's field of vision when looking through windshield 24 of the aircraft. In contrast, flight displays 20 may be located within aircraft control center 10 below the window line, requiring the pilot to look in a downward direction to view flight displays 20 (i.e., flight displays 20 may be HDDs). Flight displays 20 and/or HUD 22 may be in communication with processing electronics of an EFVS and may be configured to display, for example, EFVS imagery of structures in an airport terminal or runway environment.

According to various exemplary embodiments, HUD 22 may be configured for use by a PF in the aircraft, and one of flight displays 20 may be an HDD configured for use by a PM in the aircraft. HUD 22 may be, for example, a transparent or semi-transparent display device that allows a PF to view EFVS imagery. For example, HUD 22 may be configured to overlay an image of the external surroundings of the aircraft (e.g., structures in an airport terminal area or runway environment) over the pilot's natural unaided view of the external surroundings of the aircraft while looking through the aircraft cockpit windscreen 24. HDD 20 may be, for example, a non-transparent CRT, LCD, or LED display device mounted adjacent to or within a console or instrument panel of the aircraft. HDD 20 may be configured to present aircraft situation display map images having EFVS imagery overlaid or otherwise merged therewith. HDD 20 may be positioned such that the PM may need to look away from the cockpit windscreen in order to see the displayed images, and such that the PM may not be able to see the external surroundings of the aircraft through the cockpit windscreen while viewing HDD 20.

EFVS processing electronics on board the aircraft may be configured to provide data regarding the state of the aircraft to flight displays 20 and/or HUD 22. For example, data regarding the aircraft's altitude, heading, velocity, etc., may be provided to flight displays 20 and/or HUD 22 by the processing electronics. The processing electronics may be further configured to provide data regarding the external surroundings of the aircraft to flight displays 20 and/or HUD 22. In some embodiments, the data can be conformably represented on HUD 22 with respect to the PF's natural view of the environment outside the aircraft. In other words, data that appears on HUD 22 may be located precisely in the location of the corresponding feature in the environment outside the aircraft (e.g., a line on HUD 22 may conform to the location of the horizon as the plane moves, etc.). The data may also be provided to an HDD 20 in the context of an aircraft situation display, such as a horizontal situation display or a vertical situation display including an electronic moving map.

The processing electronics of the aircraft may receive data regarding the aircraft's surroundings from onboard sensors. For example, the aircraft may be equipped with a radar that performs vertical and horizontal radar sweeps in front of the aircraft. Radar returns may then be processed by the processing electronics to generate and provide display data to HDD 20 and HUD 22 regarding the external surroundings of the aircraft. For example, HDD 20 may provide a top-down view, a horizontal view, a vertical profile view, or any other view of structures in an airport terminal or runway environment, weather, terrain, objects, and/or other aircraft detected by processing electronics onboard the aircraft.

The processing electronics of the aircraft may also receive data regarding the aircraft's surroundings communicated from an external source (e.g., a satellite, another aircraft, a ground-based communications station, etc.). In various embodiments, communication devices in the aircraft may be configured to receive and/or transmit data with the external sources. For example, the aircraft may request data regarding the location and bearing of nearby aircraft via the communication devices. The returned data may then be processed by the processing electronics and used to provide information regarding the other aircraft to the pilot via HDD 20 and HUD 22.

A database may be stored by the processing electronics. The database may be, for example, a terrain database that may include a terrain elevation database, an obstacle location and elevation database, an aerodrome mapping database, an electronic charts and maps database, a runway database, etc. The database may be used by the processing electronics to generate aircraft situation displays of the aircraft's surroundings, such as during approach and landing procedures. For example, the database may include data regarding the location of an airport's runways, control tower, etc. In other embodiments, the database may incorporate data regarding an airport from another database stored by the processing electronics, such as a chart database configured to store airport diagrams, approach charts, etc. In various embodiments, the processing electronics may use radar returns to generate EFVS imagery and overlay or otherwise merge the EFVS imagery with the aircraft situation displays. For example, the processing electronics may use radar returns to generate image overlays of visual references required for approach and landing procedures, such as approach lighting systems, threshold lighting systems, and runway edge lighting systems.

The processing electronics may generate aircraft situation displays of the aircraft's surroundings using the database, radar returns, other sensor data, and data regarding the aircraft's altitude, bearing, and heading. For example, the processing electronics may generate a 2-D or 3-D representation of an airport terminal or runway environment in front of the aircraft from the viewing perspective of a PF and provide the representation to HUD 22. The rendition may also include various indicia regarding the current state of the aircraft. For example, the rendering on HUD 22 may include data regarding the aircraft's heading, course, altitude, or the like. The processing electronics may also generate a 2-D aircraft situation display image representative of the airport terminal or runway environment and provide the representation to HDD 20 for review by a PM. For example, the aircraft situation display image may include a 2-D electronic moving map display of the airport terminal or runway environment. The aircraft situation display image may further include an overlay including the 2-D radar image of structures in the airport terminal or runway environment. In some embodiments, the aircraft situation display image may be a horizontal situation display image including a top-down view of the airport terminal or runway environment. In some embodiments, the aircraft situation display image may be a vertical situation display image including a side view of the airport terminal or runway environment. In some embodiments, both a horizontal and vertical situation displays of the airport terminal or runway environment may be presented.

Figure 2:
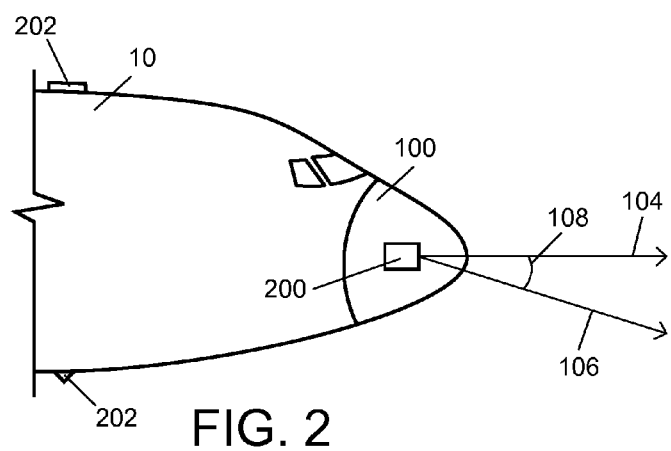
FIG. 2 is a side view schematic illustration of the front of an exemplary aircraft with an aircraft control center and nose.

Referring to FIG. 2, the front of an exemplary aircraft is shown with aircraft control center 10 and nose 100. Various sensory devices may be located along the exterior of the aircraft. In one embodiment, a radar system 200 (e.g., a Doppler weather radar system, millimeter wavelength radar system, or other radar system) may generally located within nose 100 of the aircraft or within aircraft control center 10 of the aircraft. Radar system 200 generally works by sweeping a radar beam horizontally and/or vertically along the sky. For example, radar system 200 may conduct a first horizontal sweep 104 directly in front of the aircraft and a second horizontal sweep 106 downward at some tilt angle 108 (e.g., 20 degrees down). Returns from different tilt angles may be electronically merged to form a composite image for display on an electronic display, such as an HDD 20 or HUD 22 in aircraft control center 10.

Returns may also be processed to, for example, distinguish between terrain and weather, to determine the height of terrain, or to determine the height of weather. Returns may be processed to, for example, identify structures in an airport terminal or runway environment that may serve as visual reference points during aircraft approach and landing procedures. Such structures may include, for example, runway structures such as an approach lighting system, a threshold lighting system, and or a runway edge lighting system. The aircraft may include other forms of sensors similar to radar system 200 that receive data regarding the aircraft's surroundings, in further embodiments. Other forms of sensors (not shown) may include, but are not limited to, barometers, altimeters (e.g., radio altimeters, barometric altimeters, etc.), temperature sensors, accelerometers, attitude gyros, or video sensors (e.g., infrared cameras, cameras that operate in the visual spectrum, etc.). Radar system 200 may be any radar system configured to detect or receive data for the systems and methods of the present disclosure. According to exemplary embodiments, radar system 200 may be an RTA-4218 MULTISCAN radar system, a WXR-2100 MULTISCAN radar system, or similar system manufactured by Rockwell Collins and configured in accordance with the principles described herein.

Communication devices 202 may include devices configured to receive and/or transmit data between the aircraft and one or more external sources. For example, communication devices 202 may include antennas located along the top or bottom of the aircraft to communicate with other airborne or ground-based systems. Communication devices 202 may also include communication electronics coupled to the antennas, such as receivers, transmitters, or transceivers. Communication devices 202 may include separate hardware to support different communication protocols and systems. For example, communication devices 202 may include a TCAS antenna and a separate antenna for receiving location data from a satellite-based positioning system (e.g., GPS, GLONASS, etc.). Communication devices 202 may also include shared hardware configured to communicate via multiple communication protocols.

Communication devices 202 may also receive data regarding the aircraft's surroundings. For example, communication devices 202 may receive data regarding another aircraft (e.g., range, altitude, bearing, etc.) or airport from a ground-based communications system, a satellite-based communications system, or from the other aircraft itself. The data may be received by communication devices 202 actively (e.g., in response to a request sent by communication devices 202) or passively (e.g., not in response to a request for the data). Communication devices 202 may also be configured to allow audio or video to be communicated between aircraft control center 10 and an external source. For example, communication devices 202 may transfer audio data between the aircraft's pilot and an air traffic controller or pilot of another aircraft via a radio channel.

Figure 3:
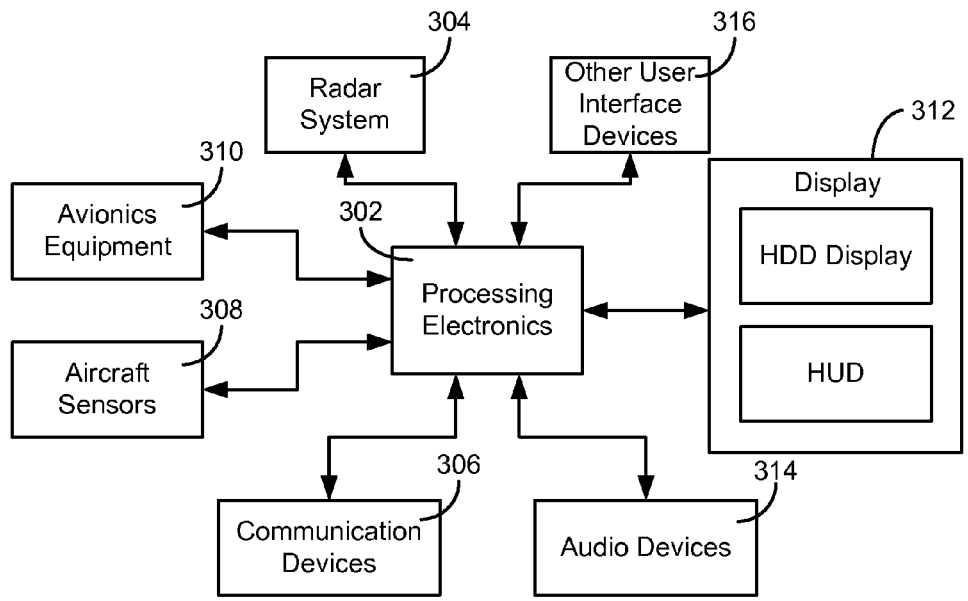
FIG. 3 is a block diagram of an exemplary EFVS.

Referring to FIG. 3, a block diagram of an exemplary aircraft EFVS 300 is shown. System 300 may include processing electronics 302. Processing electronics 302 may include one or more circuits in communication and configured to process received data and to output data based on the processed data. Processing electronics 302 may receive data from, or provide data to, any number of the aircraft's electronic devices.

Processing electronics 302 may be in communication with onboard systems configured to generate data regarding the aircraft and its surroundings. For example, processing electronics 302 may be in communication with a radar system 304 (e.g., similar to radar system 200 shown in FIG. 2). Radar system 304 may be installed on the aircraft (e.g., in nose 100 of the aircraft as shown in FIG. 2 or another location) and may be used by the various detection systems of the aircraft to detect terrain, structures, and other conditions in the environment outside the aircraft. Radar system 304 may include a radar antenna connected to circuitry configured to control the direction in which the radar antenna is pointing. Radar system 304 may also include circuitry to transmit a radar beam and to receive radar returns. According to an exemplary embodiment, radar system 304 may be a Doppler weather radar system configured to enhance reflectivity of radar returns from runway structures, such as an approach lighting system, a threshold lighting system, and or a runway edge lighting system. For example, radar system 304 may be an L, S, C, X, or K band radar system utilizing radar frequencies ranging from 1-40 GHz and/or wavelengths ranging from 0.75-30 centimeters and capable of penetrating heavy fog at distances of up to approximately 2 NM.

Processing electronics 302 may also be in communication with the communication devices 306 (e.g., similar to communication devices 202 shown in FIG. 2). Communication devices 306 may be configured to receive data regarding another aircraft from an external source, such as a ground-based communications system (e.g., air traffic control, etc.), a satellite-based communications system, or from the other aircraft itself. In one embodiment, processing electronics 302 may also transmit data via communication devices 306, such as a request for data regarding nearby aircraft. Processing electronics 302 may also communicate data regarding the aircraft (e.g., the aircraft's current state, flight plan, etc.) to an external system via communication devices 306. Communications devices 306 may include electronics configured to communicate audio and/or video between the aircraft and an external system.

Processing electronics 302 are shown in communication with aircraft sensors 308. In general, sensors 308 may be any number of sensors that measure aircraft parameters related to the state of the aircraft. For example, sensors 308 may include temperature sensors, humidity sensors, infrared sensors, altitude sensors, pressure sensors, fuel gauges, airspeed sensors, throttle position sensors, ground speed sensors, pitot-static tubes, a gyroscope, a global positioning system (GPS), a camera (e.g., an infrared camera, a microwave camera, etc.), or any other aircraft-mounted sensors that may be used to provide data to processing electronics 302. It should be appreciated that sensors 308 (or any other component shown connected to processing electronics 302) may be indirectly or directly connected to the processing electronics 302. For example, processing electronics 302 may receive a temperature reading directly from a temperature sensor and a throttle position indirectly from a position sensor via an engine controller.

Processing electronics 302 are further shown in communication with avionics equipment 310. In general, avionics equipment 310 may include other electronic control systems in the aircraft. For example, avionics equipment 310 may include a flight management system, a navigation system, a backup navigation system, or another aircraft system configured to provide inputs to processing electronics 302. For example, avionics equipment 310 may include the landing gear system of the aircraft and provide information such as whether or not the landing gear is deployed, a weight on wheels determination, or other parameters to processing electronics 302. In another example, avionics equipment 310 may provide controls inputs, such as a desired throttle or power level to processing electronics 302.

Processing electronics 302 are additionally shown in communication with displays 312 (e.g., HDD 20 and/or HUD 22 shown in FIG. 1), audio devices 314, and other user interface devices 316 (e.g., an electronic device that receives input from a user or conveys information to a user). Processing electronics 302 may generate EFVS imagery of aircraft surroundings, such as an airport terminal or runway environment, using data from radar system 304, communication devices 306, and aircraft sensors 308. For example, processing electronics 302 may generate a 2-D or 3-D representation of an airport terminal or runway environment in front of the aircraft from the viewing perspective of a PF and provide the representation to a display 312 (e.g., HUD 22 shown in FIG. 1). The rendition may also include various indicia regarding the current state of the aircraft. For example, the rendering on display 312 may include data regarding the aircraft's heading, course, altitude, or the like. The processing electronics may also generate a 2-D aircraft situation display image representative of the airport terminal or runway environment and provide the representation to a display 312 (e.g., HUD 22 shown in FIG. 1) for review by a PM. For example, the aircraft situation display image may include a 2-D electronic moving map display of the airport terminal or runway environment. The aircraft situation display image may further include an overlay including the 2-D radar image of structures in the airport terminal or runway environment. In some embodiments, the aircraft situation display image may be a horizontal situation display image including a top-down view of the airport terminal or runway environment. In some embodiments, the aircraft situation display image may be a vertical situation display image including a side view of the airport terminal or runway environment. In some embodiments, both a horizontal and vertical situation displays of the airport terminal or runway environment may be presented.

Figure 4:
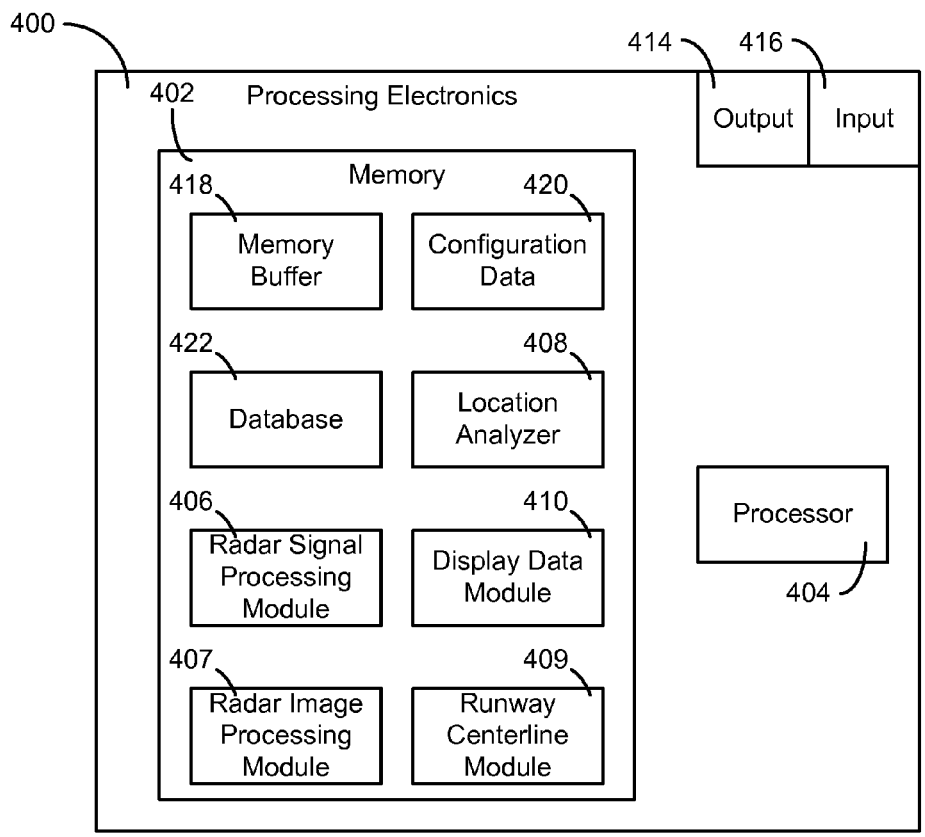
FIG. 4 is a detailed block diagram of exemplary EFVS processing electronics.

Referring now to FIG. 4, a detailed block diagram of exemplary EFVS processing electronics 400 (e.g., similar to processing electronics 302 shown in FIG. 3) is shown. Processing electronics 400 may include a memory 402 and processor 404. Processor 404 may be, or may include, one or more microprocessors, an application specific integrated circuit (ASIC), a circuit containing one or more processing components, a group of distributed processing components, circuitry for supporting a microprocessor, or other hardware configured for processing. According to an exemplary embodiment, processor 404 may be configured to execute computer code stored in memory 402 to complete and facilitate the activities described herein. Memory 402 can be any volatile or non-volatile computer-readable storage medium capable of storing data or computer code relating to the activities described herein. For example, memory 402 is shown to include modules 406, 407, 408, 409, and 410, which may be computer code modules (e.g., executable code, object code, source code, script code, machine code, etc.) configured for execution by processor 404. When modules 406, 407, 408, 409, and 410 are executed by processor 404, processing electronics 400 is configured to complete the activities described herein.

Processing electronics may include hardware circuitry for supporting the execution of the computer code of modules 406, 407, 408, 409, and 410. For example, processing electronics 400 may include hardware interfaces (e.g., output 414) for communicating control signals (e.g., analog or digital signals) from processing electronics 400 to avionics equipment (e.g., avionics equipment 310 shown in FIG. 3) and to provide signals to other devices (e.g., displays 312, audio devices 314, and other user interface devices 316 shown in FIG. 3). Processing electronics 400 may also include an input 416 for receiving, for example, data from user interface devices or other systems (e.g., communication devices 306, aircraft sensors 308, avionics equipment 310 shown in FIG. 3, etc.).

Memory 402 may include a memory buffer 418 for receiving and storing radar return data (e.g., from radar system 300 shown in FIG. 3), and other data (e.g., data received via communications devices 306, sensor data from aircraft sensors 308, and/or operational data from avionics equipment 310 shown in FIG. 3). For example, memory buffer 418 may include data regarding the aircraft's altitude, speed, heading, bearing, and other characteristics. Memory buffer 418 may also include data regarding the aircraft's external conditions, such as detected weather, wind data, terrain data, etc. In some embodiments, the data stored in memory buffer 418 may include data regarding another aircraft. For example, memory buffer 418 may include data regarding the other aircraft's location (e.g., data received or calculated regarding the other aircraft's latitude, longitude, altitude, etc.).

Memory 402 may also include configuration data 420. Configuration data 420 may include various parameters used to control which display data is provided to, for example, a HUD or an HDD, and to the other user interface devices of the aircraft. Configuration data 420 may also include one or more parameters that control when EFVS imagery regarding an airport environment, aircraft landing structure, etc. is presented to a HUD or an HDD.

Memory 402 may also include a database 422. Database 422 may include, for example data regarding the geolocation of natural and man-made terrain. A geolocation may be a set of latitude and longitude coordinates or any other form of values that uniquely define a location along the surface of the Earth. Database 422 may include data regarding the geolocations of naturally occurring terrain, such as oceans, mountains, hills, and the like. Database 422 may also include the geolocations of man-made objects and other terrain, such as airports, buildings, towers, etc. In the case of airports stored in database 422, database 422 may store data regarding the location and layout of the runways of the airport, the terminal of the airport, and the location of any other building or structure associated with the airport. In some embodiments, database 422 may include an ARINC 424 runway database that includes latitude and longitude data for airport runway endpoints. In some embodiments, database 422 may include one or more electronic moving maps for one or more airports, runways, etc.

Memory 402 may include a radar signal processing module 406 configured to receive radar returns data and generate a 3-D model based on the radar returns data (e.g., using a polar coordinate system with range, azimuth and elevation from the nose of an aircraft). In particular, module 406 may receive radar returns data from highly reflective structures in an airport terminal area or runway environment that may serve as visual reference points during aircraft approach and landing procedures. Such structures may include, for example, runway structures such as an approach lighting system, a threshold lighting system, and or a runway edge lighting system. Module 406 may generate a 3-D model representative of one or more runway structures in the airport environment based on the received radar returns data.

In order to facilitate generation of clearer images, module 406 may be configured to filter the radar returns data to identify areas in the 3-D model having a reflectivity lower than a predetermined value. In some embodiments, low energy areas in the 3-D model may be zeroed out based on their corresponding reflectivity values, such that the area will be rendered transparent. Such filtering may result in a 3-D model representative of only highly reflective structures in an airport terminal area or runway environment, such as an approach lighting system, a threshold lighting system, and or a runway edge lighting system.

Memory 402 may also include a radar image processing module 407 configured to generate 2-D images from the 3-D model. In particular, module 407 may receive data from module 406 including a 3-D model of highly reflective structures in an airport terminal area or runway environment that may serve as visual reference points during aircraft approach and landing procedures. Module 407 may generate one or more 2-D images of one or more of the structures in the 3-D model. For example, in some embodiments, module 407 may generate a top-down view of the structures. In some embodiments, module 407 may generate a side view of the structures. In some embodiments, both top-down and side views may be generated. Other 2-D views are contemplated as well.

Memory 402 may also include a location analyzer module 408 configured to determine the location of the aircraft. Location analyzer module 408 uses sensor data received via input 416 to determine location values for the aircraft, such as the geolocation of the aircraft and the altitude of the aircraft. For example, location analyzer module 408 may use received GPS data and data from a radio altimeter to determine the geolocation and altitude of the aircraft. Location analyzer module 408 may also analyze the received sensor data to determine movement-related parameters, such as the direction, heading, course, pitch, or roll of the aircraft.

Location analyzer module 408 may be configured to determine the location of airports, terrain, weather, other aircraft, and the like relative to the location of the aircraft. In particular, location analyzer module 408 may compare the determined location of the aircraft to data from database 422 to identify terrain near the aircraft. For example, location analyzer module 408 may use the geolocation, altitude, heading, etc. of the aircraft to retrieve data from database 422 regarding an airport terminal or runway environment near the aircraft for use in upcoming approach and landing procedures. Location analyzer module 408 may also compare the determined location of the aircraft to location information contained in radar returns data used by modules 406 and 407 to generate 3-D models and 2-D images of nearby airport terminal or runway environment structures (e.g., distance, altitude and azimuth data determined by radar system 304 shown in FIG. 3).

Memory 402 may also include a runway centerline module 409 configured to determine a runway centerline for a nearby runway identified by location analyzer 408. The runway centerline may be calculated in the same plane as the runway or at an angle extending from the runway. For example, the runway centerline may be calculated as extending from the landing threshold of the runway out to a predetermined distance (e.g., the runway centerline may extend out from the runway to 10 NM at an angle of 0.5° from the geometric plane of the runway). In one embodiment, runway centerline module 409 may be configured to generate a runway centerline based on a threshold distance between the aircraft and the runway. For example, runway centerline module 409 may only generate a runway centerline for a runway that is within 30 NM from the aircraft, as determined by location analyzer module 408. Runway centerline module 409 may generate a runway centerline out to any distance extending from the runway (e.g., 15 NM, 10 NM, etc.). In some embodiments, runway centerline module 409 also generates distance markers along the runway centerline that denote the distance between a point on the centerline and the runway. The distance markers may be at predetermined intervals or may be at variable intervals based on a parameter set in configuration data 420. For example, runway centerline module 409 may generate hash marks along the generated centerline and/or symbolic indicators that represent the distance from a point on the centerline to the runway.

Memory 402 may also include a display data module 410 configured to generate and provide display data to one or more displays (e.g., a HUD 22 and/or an HDD 20 as shown in FIG. 1, etc.) via output 414. For example, display data module 410 may use terrain data from terrain database 422, location data generated by location analyzer module 408, centerline data generated by runway centerline module 409, and 2-D images from radar image processing module 407 and to generate EFVS imagery representative of the external surroundings of the aircraft. Display data module 410 may also generate display data that includes indicia regarding the state of the aircraft, such as the altitude, speed, heading, etc. of the aircraft.

According to various exemplary embodiments, display data module 410 may be configured to generate a 2-D aircraft situation display image representative of the position of structures in an airport terminal or runway environment with respect to an aircraft. For example, display data module 410 may generate an aircraft situation display image including a 2-D electronic moving map display (e.g., a moving map of an airport terminal or runway environment) using data from terrain database 422. The electronic moving map may automatically scroll with movement of the aircraft in real time. The aircraft situation display image may further include an overlay including a 2-D radar image of one or more structures (e.g., runway structures) in an airport terminal or runway environment generated by radar image processing module 407. The overlay may be positioned with respect to the electronic moving map based on comparative location data received from location analyzer module 408, and may also automatically scroll with movement of the aircraft in real time (e.g., using updated imagery from radar image processing module 407). Similarly, the aircraft situation display image may further include an overlay including a runway centerline based on data generated by runway centerline module 409. Display data module 410 may also generate display data that includes indicia regarding the state of the aircraft, such as the altitude, speed, heading, etc. of the aircraft. Display data module may also generate display data that includes other terrain, air traffic, weather, etc.

In some embodiments, display data module 410 may generate a horizontal aircraft situation display image. The horizontal aircraft situation display image may include, for example, a top-down view of the airport terminal or runway environment oriented in a track-up display (e.g., an outline image or airport moving map having a top-down orientation). The aircraft situation display image may further include an overlay including a 2-D top-down radar image of one or more structures in an airport terminal or runway environment generated by radar image processing module 407. Display data module 410 may add additional display data as well.

In some embodiments, display data module 410 may generate a vertical aircraft situation display image. The vertical aircraft situation display image may include, for example, a side view of the airport terminal or runway environment. The aircraft situation display image may further include an overlay including a 2-D side view radar image of one or more structures in an airport terminal or runway environment generated by radar image processing module 407. Display data module 410 may add additional display data as well. In some embodiments, both a horizontal and vertical situation displays may be presented.

Figure 5:
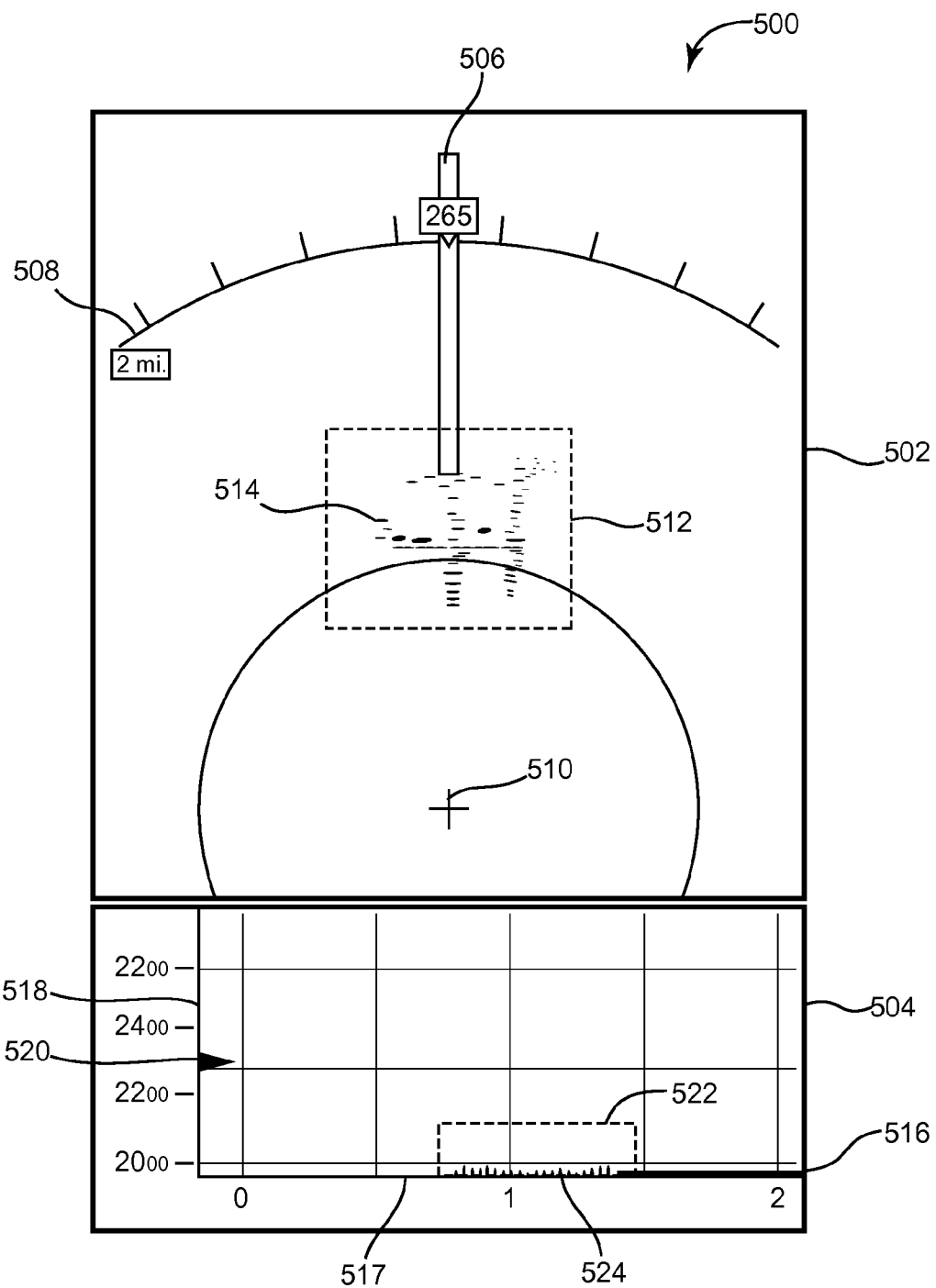
FIG. 5 is a diagram of an exemplary EFVS aircraft situation display including an electronic moving map and a radar image overlay.

Referring now to FIG. 5, a diagram of an exemplary EFVS aircraft situation display 500 including an electronic moving map and a radar image overlay is shown. In the embodiment illustrated in FIG. 5, both a horizontal situation display 502 and a vertical situation display 504 are presented. Horizontal situation display 502 includes an electronic moving map having a top-down orientation and showing an outline 506 of a runway, a range indicator 508 (set to 2 NM), and an indicator 510 of the position of the aircraft with respect to the runway.

Horizontal situation display 502 also includes an overlay 512 of a 2-D top-down radar image, such as a Doppler weather radar image. Areas of high reflectivity 514 are indicated as dark areas over a lighter background in the overlay image. Areas of mid to low reflectivity with respect to a predetermined threshold value have been filtered out to improve image clarity. Other coloring, shading, and filtering schemes are contemplated as well. Areas of high reflectivity 514 may correspond to one or more structures (e.g., runway structures) in an airport terminal or runway environment. For example, one or more areas of high reflectivity 514 may correspond to key visual references, such as the approach lighting system for the runway outlined at 506, which may be metallic structures that exhibit high radar reflectivity. As shown in FIG. 5, areas of high reflectivity 514 are aligned with the outline 506 of the runway. Accordingly, a PM viewing horizontal situation display 502 on an HDD without the benefit of a natural view of the environment outside the aircraft through a cockpit may still determine that the EFVS is operating correctly and that the PF may rely on the EFVS imagery during approach and landing procedures to identify key visual references and plan an appropriate course. Misalignments of the areas of high reflectivity 524 with the outline 516 of the runway may indicate, for example, a fault in the aircraft navigation system, the radar system, the airport runway location database, etc.

In some embodiments, additional indicia regarding the state of the aircraft, such as the altitude, speed, heading, etc. of the aircraft, or an extended runway centerline may be overlaid on horizontal situation display 502. Additional overlays may also include other terrain, air traffic, weather, etc. A PM viewing horizontal situation display 502 on an HDD without the benefit of a natural view of the environment outside the aircraft through a cockpit may use any of these additional indicia to verify the reliability and accuracy of the EFVS, as well as to verify that the PF is taking appropriate action during approach and landing procedures to track the runway. For example, the PM may verify that the aircraft heading is aligned with the runway indicated at 506, that an extended runway centerline is aligned with areas of high reflectivity 514, etc.

Vertical situation display 504 includes an electronic moving map having a side view orientation and showing an outline 516 of the runway, a range indicator 517 (set to 2 NM), an altitude indicator 518, and an indicator 520 of the position of the aircraft (e.g., altitude and range) with respect to the runway. Vertical situation display 502 also includes an overlay 522 of a 2-D side view radar image, such as a Doppler weather radar image. Areas of high reflectivity 524 are indicated as dark areas over a lighter background. Areas of mid to low reflectivity with respect to a predetermined threshold value have been filtered out to improve image clarity. Other coloring, shading, and filtering schemes are contemplated as well. As with overlay 512, areas of high reflectivity 524 may correspond to one or more structures (e.g., runway structures) in an airport terminal or runway environment. For example, one or more areas of high reflectivity 524 may correspond to key visual references, such as the approach lighting system for the runway outlined at 516, which may be metallic structures that exhibit high radar reflectivity. As shown in FIG. 5, areas of high reflectivity 524 are aligned with the outline 516 of the runway. Accordingly, a PM viewing vertical situation display 504 on an HDD without the benefit of a natural view of the environment outside the aircraft through a cockpit may still determine that the EFVS is operating correctly and that the PF may rely on the EFVS imagery during approach and landing procedures to identify key visual references and plan an appropriate course. Vertical misalignments of the areas of high reflectivity 524 with the outline 516 of the runway may indicate, for example, a fault in the aircraft altimeter, the radar system, the airport runway location database, etc.

In some embodiments, additional indicia regarding the state of the aircraft, such as the altitude, speed, heading, etc. of the aircraft, or an extended runway centerline may be overlaid on vertical situation display 504. Additional overlays may also include other terrain, air traffic, weather, etc. A PM viewing vertical situation display 504 on an HDD without the benefit of a natural view of the environment outside the aircraft through a cockpit may use any of these additional indicia to verify the reliability and accuracy of the EFVS, as well as to verify that the PF is taking appropriate action during approach and landing procedures. For example, the PM may verify that the aircraft altitude is aligned with the runway indicated at 516, that an extended runway centerline is aligned with areas of high reflectivity 524, etc.

Figure 6:
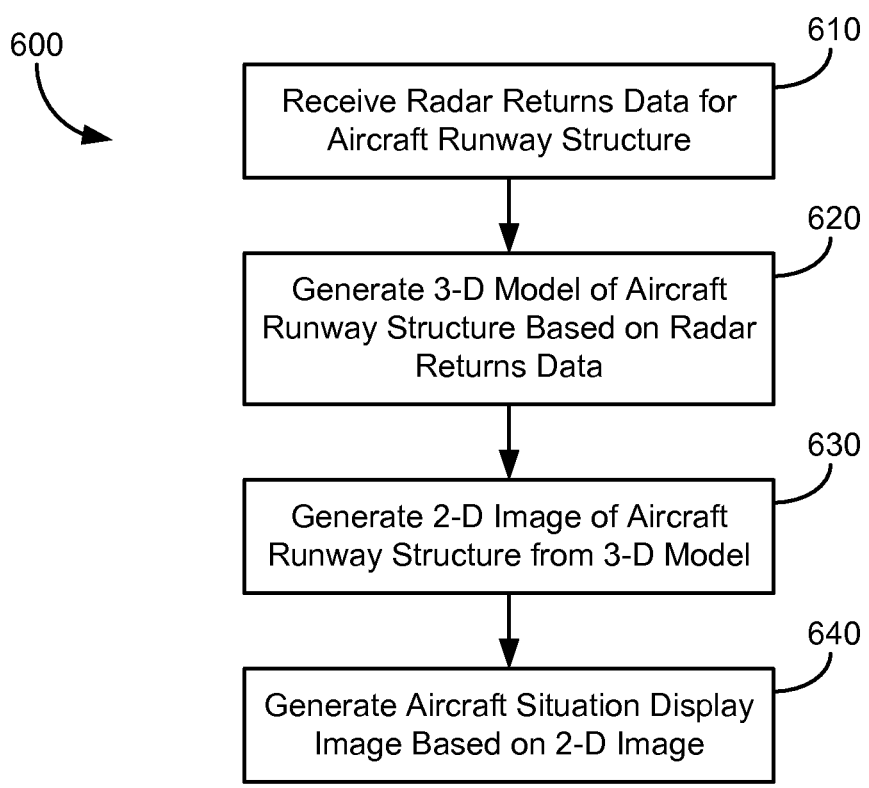
FIG. 6 is a flowchart of an exemplary process for providing EFVS images to a PM.

Referring now to FIG. 6, a flowchart of an exemplary process 600 for providing EFVS images to a PM. At a step 610, radar returns data for an runway structure may be received. For example, in some embodiments, an EFVS may receive radar returns from a Doppler weather radar system including an antenna and a transducer. The Doppler weather radar system may be configured to enhance reflectivity of radar returns from runway structures in an airport terminal or runway environment, such as an approach lighting system, a threshold lighting system, and or a runway edge lighting system. At a step 620, a 3-D model of the runway structure may be generated based on the radar returns data. In some embodiments, the radar returns data may be filtered to identify and remove areas in the 3-D model having a reflectivity lower than a predetermined value. At a step 630, a 2-D image of the runway structure may be generated from the 3-D model. For example, in some embodiments the 2-D image may be a top-down or side view of the runway structure. At a step 640, an aircraft situation display image may be generated based on the 2-D image. For example, the aircraft situation display image may include a 2-D electronic moving map display having an overlay including the 2-D radar image. In some embodiments, the aircraft situation display image may be a horizontal situation display image including a top-down view of the runway structure. In some embodiments, the aircraft situation display image may be a vertical situation display image including a side view of the runway structure. In some embodiments, both a horizontal and vertical situation displays may be presented.

The scope of this disclosure should be determined by the claims, their legal equivalents and the fact that it fully encompasses other embodiments which may become apparent to those skilled in the art. All structural, electrical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

The embodiments in the present disclosure have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments in the present disclosure have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, mini-computers, mainframe computers, and so on. Embodiments in the disclosure may also be practiced in distributed computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

An exemplary system for implementing the overall system or portions of the disclosure might include one or more computers including a processor, a system memory or database, and a system bus that couples various system components including the system memory to the processor. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein, may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present invention could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

Throughout the specification, numerous advantages of the exemplary embodiments have been identified. It will be understood, of course, that it is possible to employ the teachings herein without necessarily achieving the same advantages. Additionally, although many features have been described in the context of a particular data processor, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed is:

1. An image processing system for enhanced flight vision, comprising:
   a processor; and
   memory coupled to the processor and containing program instructions that, when executed, cause the processor to receive radar return data for a runway structure;
   generate a three-dimensional model representative of the runway structure based on the radar return data;
   generate a two-dimensional image of the runway structure from the three-dimensional model; and
   generate an aircraft situation display image representative of the position of the runway structure with respect to an aircraft based on the two-dimensional image, wherein the program instructions are further configured to cause the processor to filter the radar return data to identify areas in the three-dimensional model having a reflectivity lower than a predetermined value, wherein the data is filtered to reduce the radar return data in the areas to be zeroed out.

2. The system of claim 1, wherein the radar return data includes Doppler weather radar system data.

3. The system of claim 1, wherein the program instructions are further configured to cause the processor to display the aircraft situation display image on a head down display.

4. The system of claim 1, wherein the aircraft situation display image includes an electronic moving map display having an overlay including the two-dimensional image.

5. The system of claim 1, wherein the aircraft situation display image is a horizontal situation display image including a top-down view of the runway structure.

6. The system of claim 1, wherein the aircraft situation display image is a vertical situation display image including a side view of the runway structure.

7. The system of claim 1, wherein the program instructions are further configured to cause the processor to reduce the radar return data in the areas in the three-dimensional model to a predetermined number.

8. A method of providing enhanced flight vision, comprising:
   receiving radar return data for a runway structure;
   generating a three-dimensional model representative of the runway structure based on the radar return data;
   filtering the radar return data to identify areas in the three-dimensional model having a reflectivity lower than a predetermined value, wherein the filtering reduces the radar return data in the areas to a zero value;
   generating a two-dimensional image of the runway structure from the three-dimensional model; and
   generating an aircraft situation display image representative of the position of the runway structure based on the two-dimensional image.

9. The method of claim 8, wherein the radar return data includes Doppler weather radar system data.

10. The method of claim 8, further comprising displaying the aircraft situation display image on a head down display.

11. The method of claim 8, wherein generating the aircraft situation display image includes generating an electronic moving map display having an overlay including the aircraft situation display image.

12. The method of claim 8, wherein the aircraft situation display image is a horizontal situation display image including a top-down view of the runway structure.

13. The method of claim 8, wherein the aircraft situation display image is a vertical situation display image including a side view of the runway structure.

14. The method of claim 8, wherein the filtering enhances highly reflective runway structures.

15. An enhanced flight vision system, comprising:
   a Doppler weather radar system including an antenna and a transducer configured to enhance reflectivity of radar returns from runway structures;
   processing electronics in communication with the weather radar system and configured to generate two-dimensional aircraft situation display images representative of the position of the runway structures based on the radar returns, wherein the processing electronics are configured to filter data associated with the radar returns to identify areas in a three-dimensional model having a reflectivity lower than a predetermined value, wherein the data is zeroed out in the areas; and
   a display in communication with the processing electronics and configured to display the aircraft situation display images.

16. The system of claim 15, wherein the processing electronics are further configured to generate three-dimensional models representative of the runway structures based on the radar returns.

17. The system of claim 16, wherein the processing electronics are further configured to generate two-dimensional images of the runway structures from the three-dimensional model, and to generate the aircraft situation display images based on the two-dimensional images.

18. The system of claim 15, wherein the display is a head down display.

19. The system of claim 15, wherein the aircraft situation display images comprise horizontal situation display images including a top-down view of the runway structure.

20. The system of claim 15, wherein the aircraft situation display images comprise vertical situation display images including a side view of the runway structure.

* * * * *